United States Patent
Ichigaya

(10) Patent No.: US 6,222,181 B1
(45) Date of Patent: Apr. 24, 2001

(54) POSITION MEASURING INSTRUMENT MEASURING RELATIVE TURNING ANGLE OF LIGHT SOURCES FOR RECEIVING DEVICES

(75) Inventor: Hiroshi Ichigaya, Urawa (JP)

(73) Assignee: Seft Development Laboratory Co., Ltd., Saitama (JP)

( * ) Notice: Subject to any disclaimer, the term of this patent is extended or adjusted under 35 U.S.C. 154(b) by 0 days.

(21) Appl. No.: 08/913,233

(22) PCT Filed: Mar. 8, 1996

(86) PCT No.: PCT/JP96/00583

§ 371 Date: Feb. 18, 1999

§ 102(e) Date: Feb. 18, 1999

(87) PCT Pub. No.: WO96/28707

PCT Pub. Date: Sep. 19, 1996

(30) Foreign Application Priority Data

| Mar. 10, 1995 | (JP) | 7-079816 |
| May 19, 1995 | (JP) | 7-145339 |
| Jul. 25, 1995 | (JP) | 7-188992 |
| Jan. 30, 1996 | (JP) | 8-013480 |
| Jan. 30, 1996 | (JP) | 8-013481 |

(51) Int. Cl.$^7$ .................................................. G01D 5/34
(52) U.S. Cl. ................... 250/231.13; 250/231.16
(58) Field of Search ......................... 250/231.13, 231.16, 250/237 R, 237 G, 208.2, 221, 223 R, 224, 559.15; 356/375, 138, 141.2, 141.1; 364/481, 487

(56) References Cited

U.S. PATENT DOCUMENTS

| 4,616,931 | 10/1986 | Studer | 356/373 |
| 5,719,789 | * 2/1998 | Kawamata | 364/561 |

OTHER PUBLICATIONS

"Subpixel Accuracy Location Estimation from Digital Signals", Jean Pierre Fillard (University Montpellier II, Montpellier Cedex, France); 2417 Optical Engineering; Nov. 1992, Bellingham, WA; vol. 31, No. 11; pp. 2465–2471.

* cited by examiner

Primary Examiner—Que T. Le
(74) Attorney, Agent, or Firm—Rabin & Champagne, P.C.

(57) ABSTRACT

A position measuring apparatus consists of light receiving means in which a plurality of light receiving devices linearly arranged at an equal interval in the one-dimensional case are grouped so that each group includes the same number of light receiving devices and light source means for radiating light on this light receiving means. A single light source system, a plural light source system, a slight difference system, an interference system and an interference slight difference system which are respectively different in the constitution of this light source means are provided. Signals output from grouped corresponding light receiving devices in the respective groups are added and the periodic function is obtained by arranging this added result at an equal interval. The relative position of light receiving means and light source means in actual space can be precisely obtained by calculating the phase of this periodic function.

2 Claims, 29 Drawing Sheets

FIG. 15
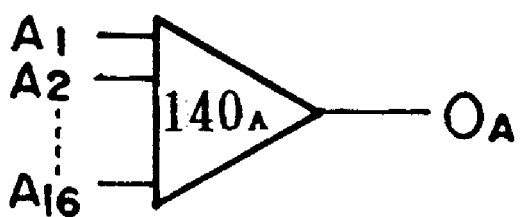
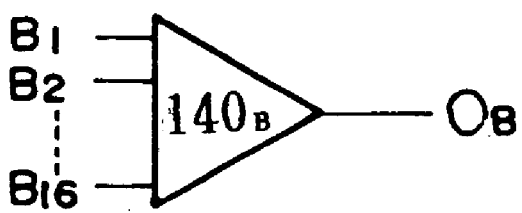
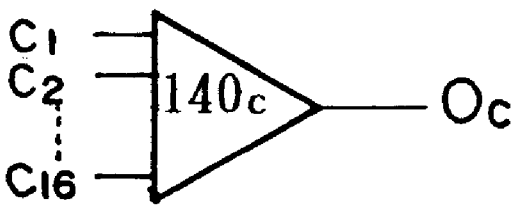
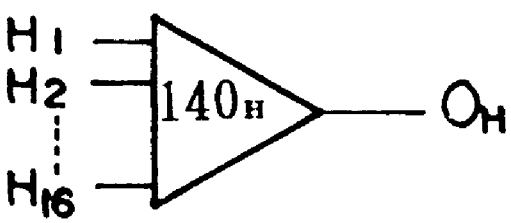

FIG. 16
(a)
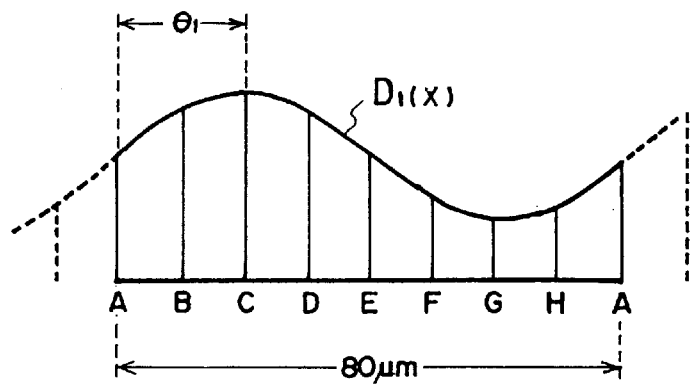
(b)
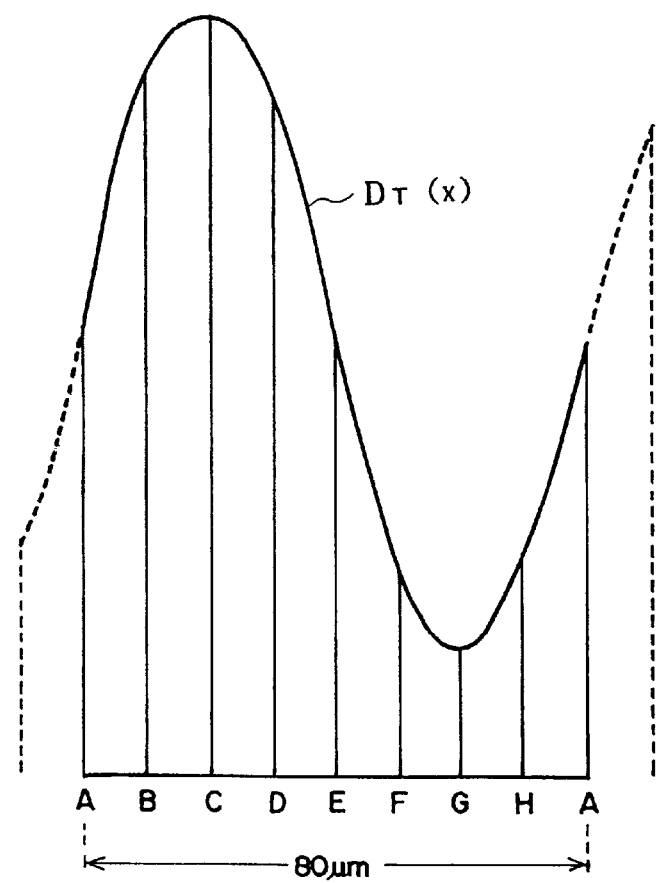

FIG. 17
(a)
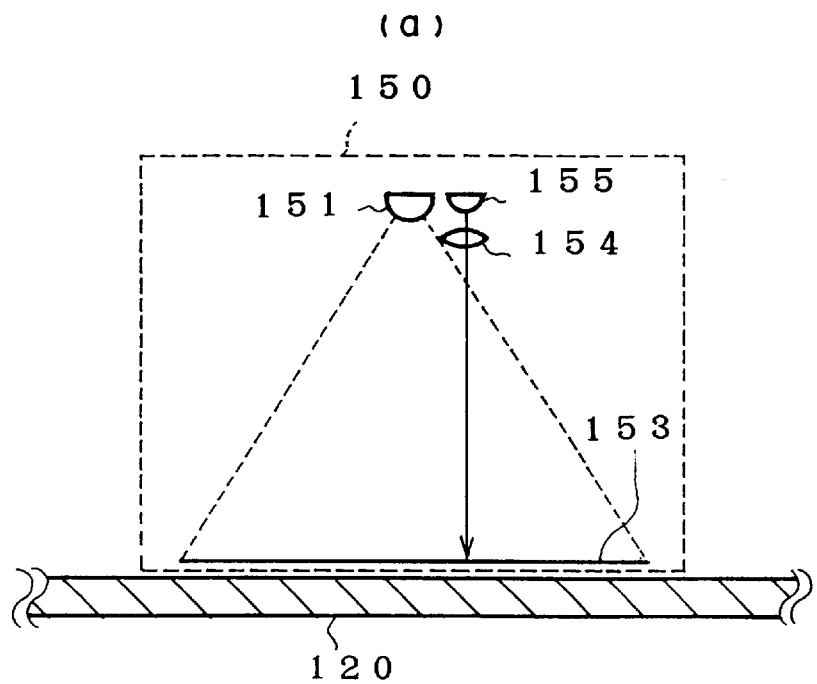
(b)
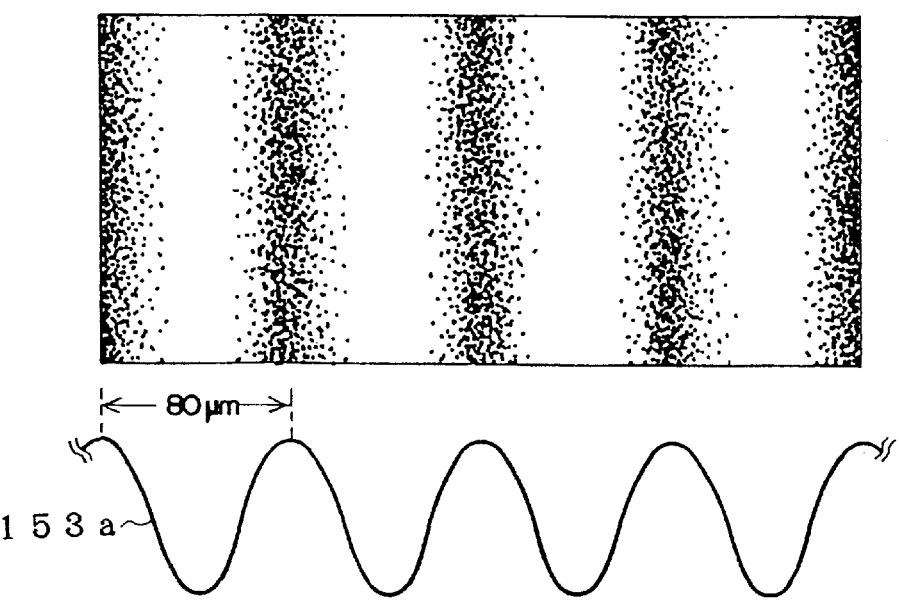

FIG. 18
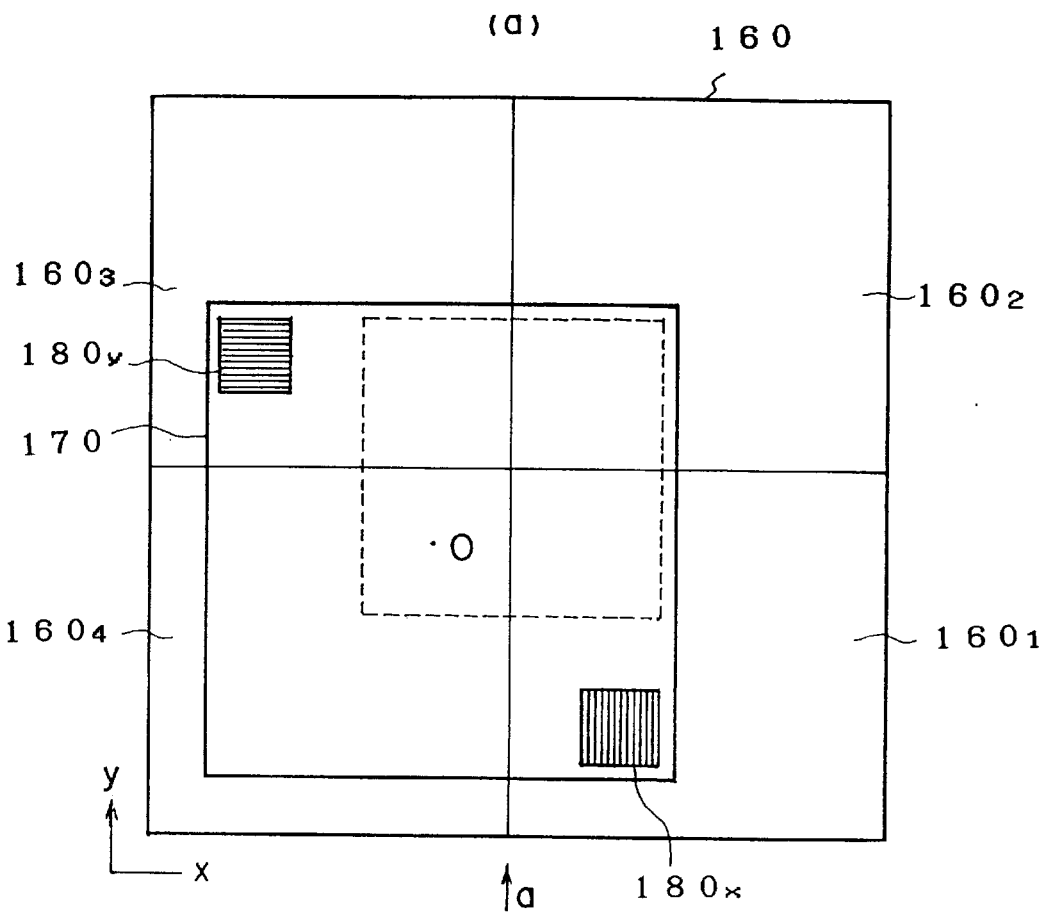
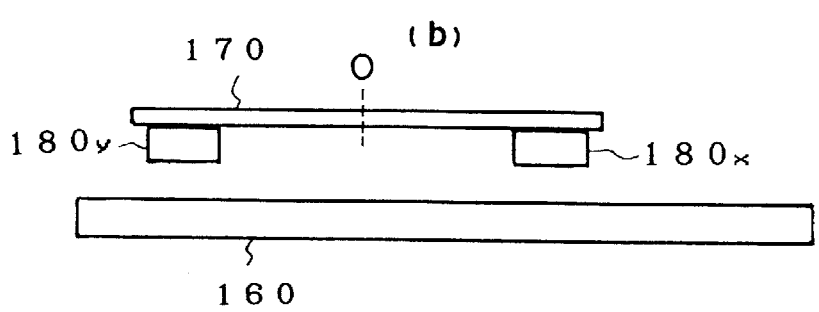

FIG. 19
(a)
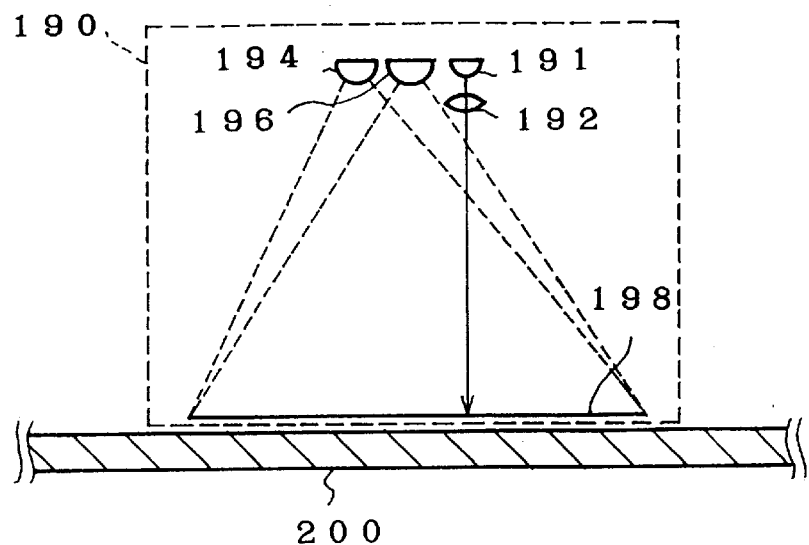
(b)
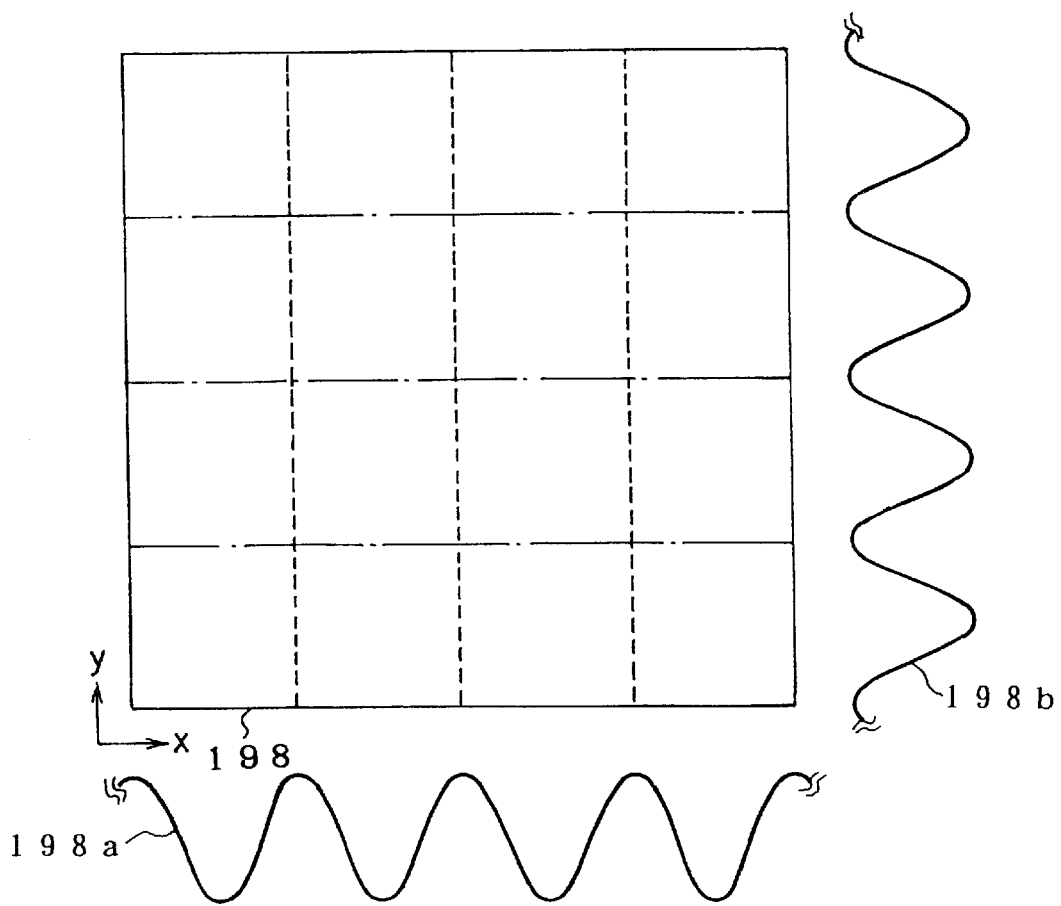

POSITION MEASURING INSTRUMENT MEASURING RELATIVE TURNING ANGLE OF LIGHT SOURCES FOR RECEIVING DEVICES

TECHNICAL FIELD

The present invention relates to a position measuring apparatus which can be applied to all fields requiring precise positional measurement.

BACKGROUND ART

The measurement of precise distance and length (hereinafter generally called distance) is important in various fields and various methods are practically used. To obtain distance between two points, it is required to precisely measure the relative positions of the two points. For general means used for measuring distance or a relative position, calipers, a micrometer, a dial gauge, a magnetic scale, a laser length measuring machine, a microscope and others are known. As machining means and an object to be machined are required to be precisely positioned in many fields such as the fields of semiconductor integrated circuit technology and a machine tool, the high precision measurement of distance or a relative position is required as the precondition.

For example, in the field of manufacturing semiconductor devices, the precise measurement of distance for positioning is required in many steps from the formation of devices on a semiconductor wafer to the dicing, wire bonding and packaging of a chip. The technique of pattern recognition may be used for a method for positioning in dicing. In the case of an automated machine tool, the precise detection of a relative position between the tool and a work to be processed is also essential and positioning is executed by a method of detecting the movement distance of a work to be processed based upon, for example, a signal from an encoder and the like and numerically controlling the position of the tool and the work to be processed based upon the detected movement distance.

However, there is a problem that though a conventional type position measuring apparatus is suitable for measuring a position in a specific field, it is difficult to immediately use it for measuring a position in the other field. The precision is also limited.

The present invention is made from the above circumstances and the object is to provide a position measuring apparatus by which high precision positional measurement in various fields is enabled on a simple principle.

DISCLOSURE OF THE INVENTION

A first invention for achieving the above object is characterized in that it is provided with light receiving means ($p=q\times r$) constituted by dividing total p pieces of light receiving devices linearly arranged at an equal interval into r pieces groups including q pieces of light receiving devices in a group, light source means which can be moved along the above light receiving means in the direction of the arrangement of the above light receiving devices for radiating light to the a plurality of the light receiving devices of the light receiving means, first position specifying means for specifying the position of the above light source means using the length of the above one group as the unit and second position specifying means for obtaining the periodic function from q pieces of signals obtained by adding the output of the corresponding light receiving devices in each of the r pieces of groups and determining the position of the above light source means in the range of the length of one group by calculating the phase of this periodic function and in that the relative position of the above light source means for the above light receiving means is measured.

A second invention for achieving the above object is characterized in that it is provided with light receiving means constituted by dividing total p pieces of light receiving devices linearly arranged at an equal interval into r groups each of which includes q pieces of light receiving devices($p=q\times r$), light source means in which a plurality of light sources arranged at an interval equal to an interval between the groups of the above light receiving devices respectively emit light to the light receiving means at predetermined intensity distribution and which is opposite to the light receiving means and can be generally moved in parallel along the direction in which the light receiving devices of the above light receiving means are arranged, first position specifying means for specifying the position of the above light source means in units of the length of the above one group and second position specifying means for obtaining the periodic function from q pieces of signals obtained by adding the output of the corresponding light receiving devices in each of the r pieces of groups and determining the position of the light source means in the range of the length of one group by calculating the phase of this periodic function and in that the relative position of the above light source means for the above light receiving means is measured.

A third invention for achieving the above object is characterized in that it is provided with light receiving means constituted by dividing a plurality of light receiving devices linearly arranged at an equal interval into groups so that i pieces of light receiving devices are included in each group, light source means in which j ($j\neq i$) pieces of light sources for emitting light to the above light receiving means in a predetermined range are included per distance equal to the dimension of one group of the above light receiving devices and which can be generally moved in parallel to the light receiving devices of the light receiving means, first position specifying means for specifying the relative position of the above light source means and the above light receiving means using distance between light sources of the light source means as the unit and second position specifying means for calculating the relative position of the above light receiving means and the above light source means in the range of the above distance between light sources by adding signals output from the light receiving devices arranged in the corresponding position in the respective groups when light receiving devices receive light from light sources, obtaining the periodic function from the i pieces of adding results and calculating the phase of this periodic function and in that the relative position of the light source means for the light receiving means is measured.

A fourth invention for achieving the above object is characterized in that it is provided with light receiving means ($p=q\times r$) constituted by dividing total p pieces of light receiving devices linearly arranged at an equal interval into r pieces of groups including q pieces of light receiving devices in each group, optical interference means arranged opposite to the light receiving face of the above light receiving means so that it can be moved in parallel in the direction of the arrangement of the above light receiving devices for generating an interference fringe due to interference of light which is incident on the above light receiving face and changing the intensity of light at a repetition period equal to the length of one group of the above light receiving means on the above light receiving device, first position specifying means for specifying the position of the above optical interference means using the above group as the unit and second position specifying means for obtaining the periodic function from q pieces of signals obtained by adding signals output from the corresponding light receiving device in each of the r pieces groups when light is incident from the above optical interference means and determining the position of the above optical interference means in the range of the length of one group by calculating the phase of this periodic function and in that the relative position of the optical interference means for the above light receiving means is measured.

A fifth invention for achieving the above object is characterized in that it is provided with light receiving means constituted by dividing a plurality of light receiving devices linearly arranged at an equal interval into groups so that i pieces of light receiving devices are included in each group, optical interference means arranged opposite to the light receiving face of the above light receiving means which can be moved in parallel along the direction of the arrangement of the above light receiving devices for generating an interference fringe due to interference of light which is incident on the above light receiving face and for forming j (j # i) pieces interference fringes per distance equal to the dimension of one group of the light receiving devices on the light receiving face, first position specifying means for specifying the relative position of the above optical interference means and the above light receiving means using distance equal to an interval between the interference fringes as the unit, adding means for adding signals output from light receiving devices arranged in the corresponding position in the respective groups when the above each light receiving device receives light by the above interference fringe and outputting the result of i pieces of calculations and second position specifying means for calculating the relative position of the above light receiving means and the above optical interference means in the range of distance equal to an interval between the interference fringes by obtaining the periodic function from i pieces of adding results obtained as a result of adding operation by the above adding means and calculating the phase of this periodic function and in that the relative position of the above optical interference means for the above light receiving means is measured.

In the first invention, when the light source means provided with predetermined intensity distribution for emitting light is moved along the light receiving device as described above, the spot of light radiated from the light emitting means to the light receiving means is also moved. Therefore, the distribution of the intensity of a signal output from each light receiving device is different depending upon the relative position of the light receiving means in which light receiving devices are arranged and the light source means. The first position specifying means specifies the position of the light source means using the length of one group as the unit based upon the adding result of light receiving devices included in each group using the above signal and the second position specifying means obtains a periodic function by adding the output of the corresponding light receiving devices in each group and determines the position of the light source means in the range of the length of one group based upon the calculation of the phase of this periodic function.

In the second invention, as a plurality of the light sources of the light source means are arranged at an equal interval to an interval between the groups of the light receiving means as described above, the intensity of light which is incident on the light receiving means is changed at a repetition period equal to the length of a group. Therefore, the intensity of light received by the corresponding light receiving device in each group is equal in a part of the light receiving means to which light from the light source is incident. When the light source means is moved along the light receiving devices, the spot of light radiated from the light emitting means to the light receiving devices is also moved. Therefore, the distribution of the intensity of a signal output from each light receiving device is different depending upon the relative position of the light receiving means in which light receiving devices are arranged and the light source means. The first position specifying means specifies the position of the light source means using the length of one group as the unit. The second position specifying means obtains a periodic function by adding the output of the corresponding light receiving devices in the respective groups and determines the position of the light source means in the range of the length of one group based upon the calculation of the phase of this periodic function. In the second invention, the amplitude of this periodic function is magnified by using a plurality of light sources, the precision of the calculation of a phase is enhanced and as a result, the precision of positional measurement is enhanced.

In the third invention, when signals output from i pieces of light receiving devices included in one group are arranged if the value of 'i' and 'j' is a little different, they are in the shape of a sinusoidal wave. If the i pieces of adding results obtained by adding signals output from the corresponding light receiving devices in the respective groups are arranged, they similarly form a periodic function in the shape of a sinusoidal wave. In this case, when the light source means is moved in the direction of the arrangement of light receiving devices by distance equal to an interval between light sources, it varies for one period at an amplitude just equal to the amplitude of the periodic function. This means one period of the above periodic function corresponds to the distance between light sources. Therefore, when the phase of this periodic function from the reference point to a specific value, for example the peak value of the periodic function is obtained by second position measuring means, the relative position of the light source means and the light receiving means in the range of distance between light sources can be calculated. The first position specifying means specifies between what light sources the light receiving means exists. As a result, the relative position of the light source means and the light receiving means is obtained.

In the fourth invention, the intensity of light is changed on the light receiving face of the light receiving means at a repetition period equal to an interval between groups of the light receiving means by the optical interference means as described above. That is, an interference fringe is formed on the light receiving face at an interval equal to an interval between groups of the light receiving means. Therefore, the intensity of light received by the corresponding light receiving device in each group is equal in the range of the light receiving means to which light from the optical interference means is incident. When the optical interference means is moved along the light receiving devices, the interference fringe of light radiated to each light receiving device is also moved. Therefore, the distribution of the intensity of a signal output from each light receiving device is different depending upon the relative position of the light receiving means in which the light receiving devices are arranged and the optical interference means. The first position specifying means specifies the position of the optical interference means using the length of a group as the unit. The second position specifying means obtains a periodic function by adding the output of the corresponding light receiving devices in the respective groups and determines the position of the optical interference means in the range of the length of one group based upon the calculation of the phase of this. The utilization of an interference fringe is equivalent to a case in which a plurality of light sources are used. As a result, the amplitude of this periodic function is magnified, the precision of the calculation of a phase is enhanced and as a result, the precision of positional measurement is enhanced.

In the fifth invention, j pieces of interference fringes are formed on the light receiving face of the light receiving means per distance equal to the dimension of one group consisting of light receiving devices by the optical interference means as described above. Therefore, when signals output from i pieces of light receiving devices included in one group are arranged if the value of 'i' and 'j' is a little different, they form a sinusoidal wave. If i pieces adding results obtained by adding signals output from the corresponding light receiving devices in the respective groups are arranged, they similarly form a periodic function in the shape of a sinusoidal wave. In this case, when the optical interference means is moved in the direction of the arrangement of light receiving devices by distance equal to an interval between interference fringes, it varies for one period at an amplitude just equal to the amplitude of the periodic function. This means one period of the above periodic function corresponds to the interval between interference fringes. Therefore, when the phase of this periodic function from the reference point to a specific value, for example the peak value of the periodic function is obtained by the second position specifying means, the relative position of the optical interference means and the light receiving means in the range of distance equivalent to an interval between interference fringes corresponding to this phase can be calculated. The first position specifying means specifies that the light receiving means exists between what interference fringes. As a result, the relative position of the optical interference means and the light receiving means is obtained.

BRIEF DESCRIPTION OF THE DRAWINGS

FIG. 15 shows adding circuits for adding signals output from the corresponding cells of CCD shown in FIG. 10 in the respective groups;

FIG. 16A–16B show the result of arranging the output of each adding circuit on the horizontal axis at an equal interval;

FIG. 17(a) is a schematic sectional view showing a modified embodiment of the sixth embodiment;

FIG. 17(b) is a schematic plan enlarging a part of a mask used for this light source;

FIG. 18(a) is a schematic plan showing a seventh embodiment;

FIG. 18(b) is a schematic side view showing the device shown in FIG. 18(a) viewed from the direction shown by an arrow a;

FIG. 19(a) is a schematic sectional view showing an eighth embodiment;

FIG. 19(b) is a schematic plan enlarging a part of a mask used for the light source of this device;

BEST MODE FOR EMBODYING THE INVENTION

Figure 1:
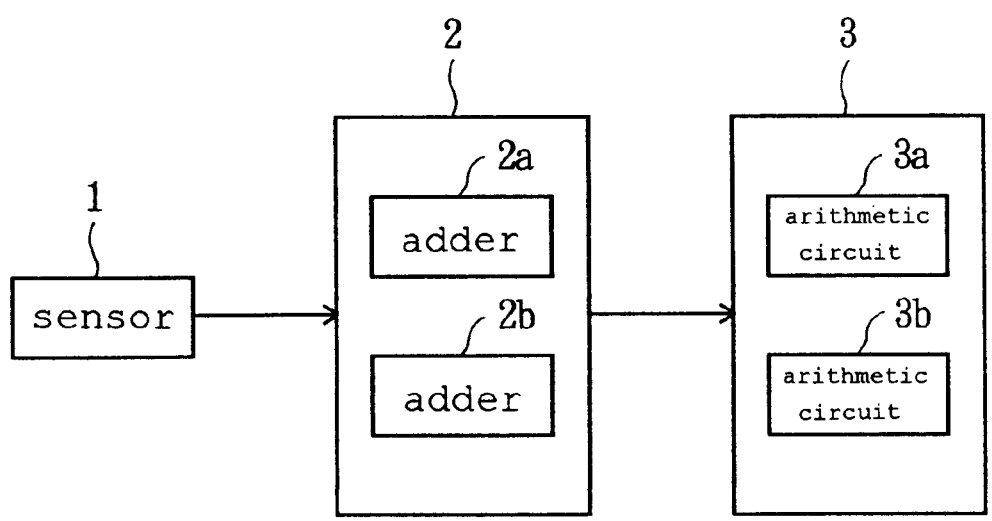
FIG. 1 is a schematic block diagram showing a position detecting apparatus in a first embodiment.

Referring to the drawings, the best mode for embodying the present invention will be described below. For convenience, hereinafter, the first to fifth embodiments are called "Single light source system" (first invention), the sixth to eighth embodiments are called "a Plurality of light source system" (second invention), the ninth to fourteenth embodiments are called "Slight differential system" (third invention), the fifteenth embodiment is called "Interference system" (fourth invention) and the sixteenth embodiment is called "Interference slight differential system" (fifth invention) due to the differences among principles for measuring a position.

First, referring to FIGS. 1 and 2, the basic principle of each embodiment according to a single light source system will be described.

FIG. 1 is a schematic block diagram showing a position detecting apparatus according to a first embodiment of a single light source system. As shown in FIG. 1, a sensor 1 is a photosensor, CCD or the like consisting of multiple cells described later and transduces light received from a light source 6 shown in FIG. 2 into an electric signal. Multiple cells in the sensor 1 are divided into the predetermined number of groups. The output of the sensor 1 is sent to an adding circuit 2. The adding circuit 2 consists of an adder 2a for adding the output of cells included in each divided group in the sensor 1 and an adder 2b for adding the output of cells included in each group. An arithmetic unit 3 consists of an arithmetic circuit 3a for obtaining a large address described later and an arithmetic circuit 3b for obtaining "a small address" described later respectively based upon the output of the adding circuit 2.

Figure 2:
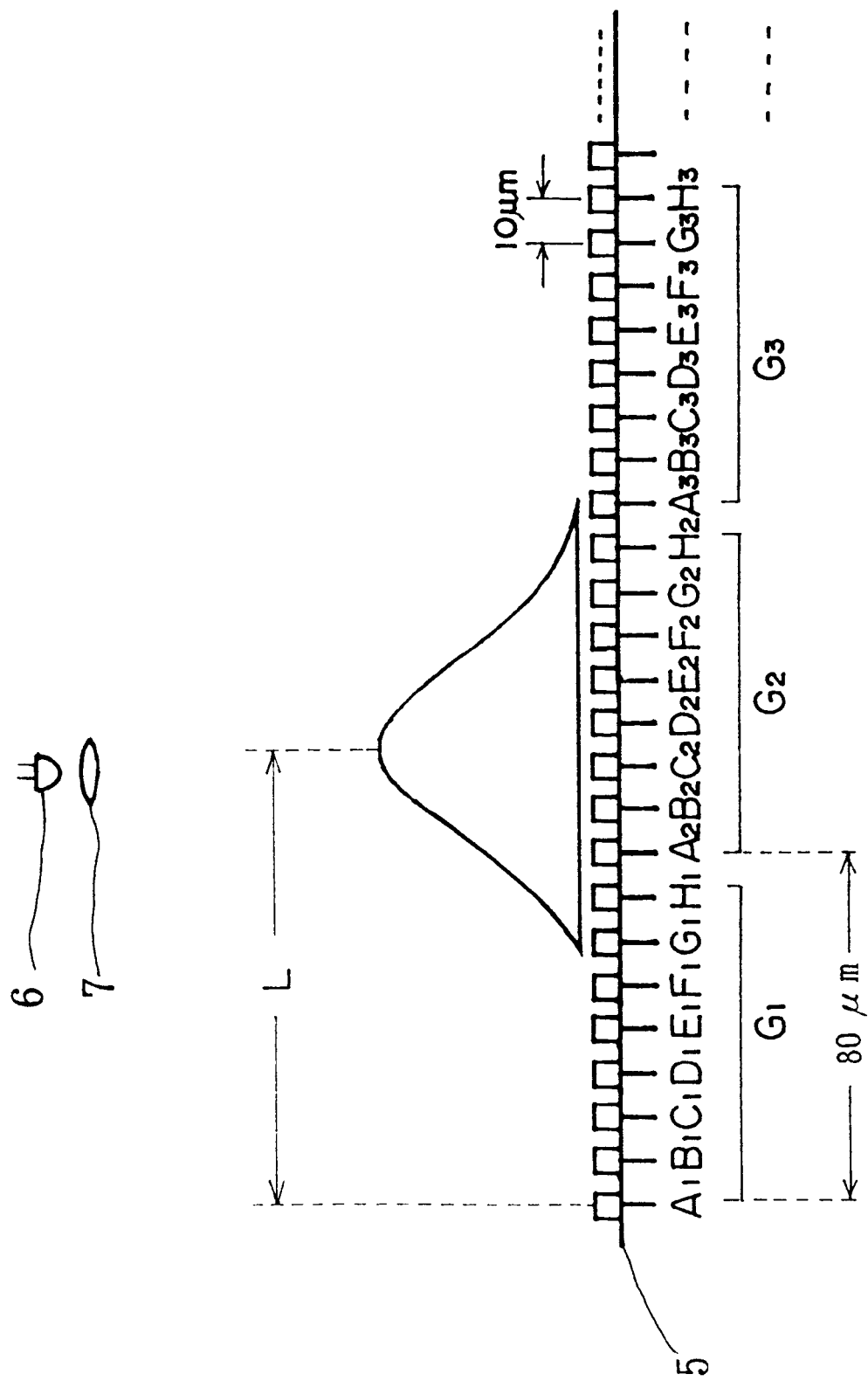
FIG. 2 is a schematic diagram showing multiple phototransistors arranged in a line in the position detecting apparatus in the first embodiment.

FIG. 2 is a schematic diagram showing multiple phototransistors arranged in a line in a position detecting apparatus according to the first embodiment of a single light source system. FIG. 2 shows a line sensor 5 where multiple phototransistor cells A1, B1 - - - , G8, H8 are linearly arranged, a light source 6 over the line sensor 5 which can be moved in parallel in the direction of the arrangement of the cells of the line sensor 5 and a lens 7 moved together with the light source 6 for suitably focusing light from the light source 6 on the line sensor 5. The line sensor 5 is equivalent to the sensor 2 shown in FIG. 2. For the light source 6, for example, a light emitting diode (LED) can be used. Each cell of the line sensor 5 is arranged precisely, for example at the interval of 10 μm. These cells are divided into eight groups and serial eight cells form a group such as eight cells A1 to H1 form a group G1, eight cells A2 to H2 form a group G2 , - - - ,and eight cells A8 to H8 form a group G8.

A curve shown over the cell array shows the intensity distribution of the spot of light from the light source 6 such as LED which is incident on the cell array of the line sensor. In an example shown in FIG. 2, there is a peak between a cell C2 and a cell D2 in the group G2. Therefore, the center of the light source 6 is located in the peak of this curve in the direction of the arrangement of cells. It is desirable that the width (for example, the half-width in which intensity falls to half of peak value) of the intensity distribution of the spot of light radiated from the light source 6 and the lens 7 on the line sensor 5 is equivalent to approximately the width of a few cells of the line sensor 5, in the concrete, approximately between the length equivalent to the width of approximately q/3 pieces of cells and the length equivalent to the width of q pieces of cells when the number of cells included in a group is assumed to be 'q'. It is because a high-order harmonic components are reduced and the error of positional measurement is reduced by suitably widening intensity distribution when a signal waveform is made periodic as described later. If the lens is excessively focused and light is converged on only one cell or if a spot greatly exceeds the width of eight cells in the case shown in FIG. 2, operation for detecting a position described later is disabled. Therefore, the lens 7 provided in the vicinity of the light source 6 is defocused to become slightly underfocus or overfocus by adjusting the lens 7 and the half-width of the intensity distribution of a spot is adjusted to correspond to approximately the width of a few cells as shown in FIG. 2.

Figure 3:
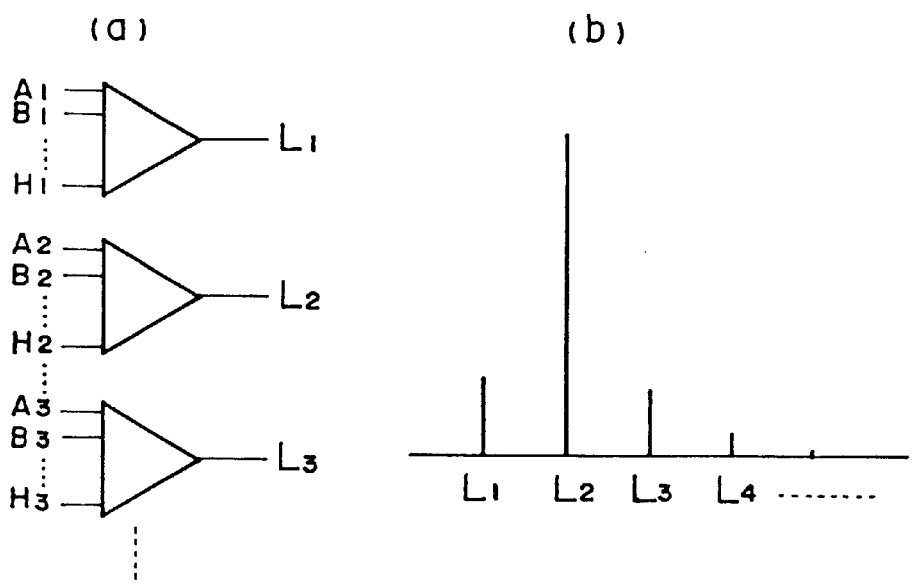
FIG. 3(a) shows adding circuits for adding the output of phototransistors in the same group shown in FIG. 2.
FIG. 3(b) is a graph showing the output of each adding circuit shown in FIG. 3(a) on the vertical axis.

FIG. 3($a$) shows adding circuits each of which consists of an operational amplifier for adding the output of each cell included in the same group shown in FIG. 2 for every group. This is equivalent to the adding circuit 2$a$ shown in FIG. 1. FIG. 3($b$) is a graph showing the output of each adding circuit shown in FIG. 3($a$), that is, the intensity of signals L1 to L8 which are obtained by adding the output of the cells included in the same group are on the vertical axis. If the center of the spot of light from the light source which is incident on a phototransistors is in the range of the group G2 as shown in FIG. 2, the intensity of the signal L2 is extremely enhanced, compared with that of the others as shown in FIG. 3($b$). Therefore, it can be readily known in which group of the cell range the center of light is located by comparing the intensity of the signals L1 to L8. Such processing is executed in the arithmetic circuit 3$a$ of the arithmetic unit 3 shown in FIG. 1.

Figure 4:
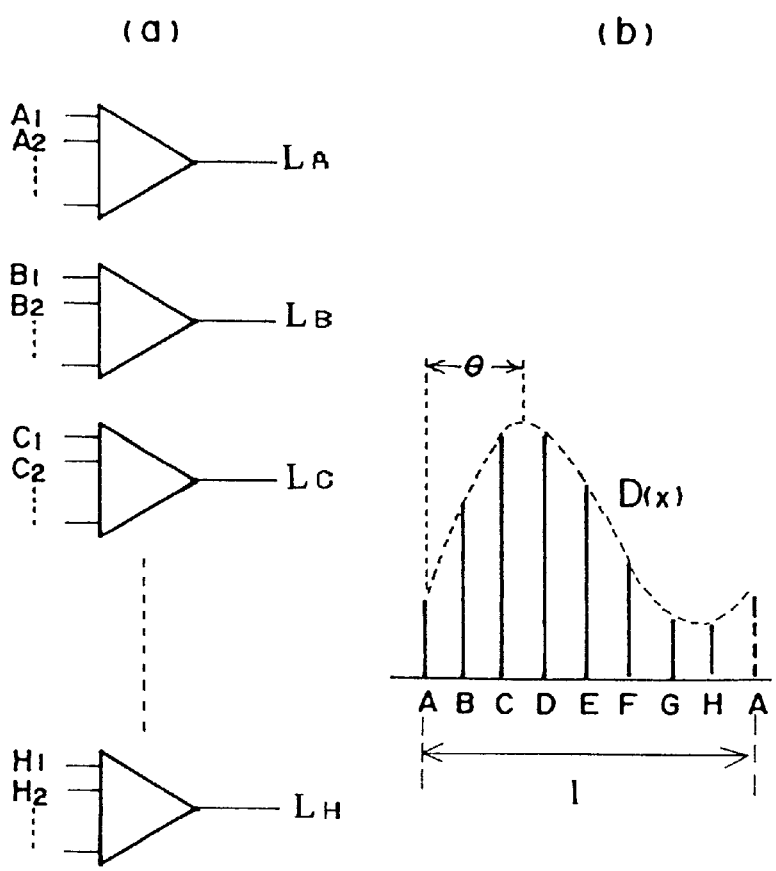
FIG. 4(a) shows adding circuits for adding the output of corresponding cells included in each group and FIG. 4(b) is a graph showing the output of each adding circuit shown in FIG. 4(a) on the horizontal axis at an equal interval.

FIG. 4($a$) shows an adding circuit for adding the output of each cell shown in FIG. 2 to every corresponding cells in the respective groups using an operational amplifier. This adding circuit is equivalent to the adding circuit 2$b$ shown in FIG. 1. FIG. 4($b$) is a graph showing the output of each adding circuit shown in FIG. 4($a$), that is, signals LA to LH added every corresponding cells and obtained as A to H on the horizontal axis at an equal interval. The envelope of the intensity of the signals LA to LH is a periodic function D($x$) in the shape of a sinusoidal wave as shown by a broken line in FIG. 4($b$). In this case, when the phase of the periodic function D($x$) is considered, the value of A (at the left end in FIG. 4($b$)) is a reference point. If such a periodic function D($x$) is obtained, a phase θ from the reference point A to the peak value can be readily and precisely obtained analogically using a well-known arithmetic circuit. To obtain this θ means to obtain the phase of the first higher harmonics of the periodic function D($x$). Such processing is executed in the arithmetic circuit 3$b$ of the arithmetic unit 3 shown in FIG. 1.

Next, a method for obtaining this θ will be briefly described. Suppose that a waveform D($x$) shown in FIG. 4($b$) is obtained in an expression, $$D(x) = K \cos(x-\theta)$$

In this expression, 'θ' shows the phase of the peak value of D($x$) as shown in FIG. 4($b$) and at this time, the value is unknown. 'K' is a constant. If 'cos x' is multiplied by D($x$) and it is integrated from zero to 2π over one period, that is, an expression, $$\int \cos x \cdot K \cos(x-\theta) dx$$

is assumed to be C, C is equivalent to a real component in Fourier transform. When this integration is calculated:

$$C = \pi K \cos \theta. \quad (1)$$

If 'sin x' is multiplied by D($x$) and it is integrated over one period, that is, an expression:

$$\int \sin x \cdot K \cos(x-\theta) dx$$

is assumed to be S, S is equivalent to an imaginary component in Fourier transform. When this integration is calculated:

$$S = \pi K \sin \theta \quad (2)$$

S/C=tanθ based upon the expressions (1) and (2) and 'θ' can be obtained in an expression:

$$\theta = \tan^{-1}(S/C). \quad (3)$$

The value of 'θ' obtained in the expression (3) is indefinite by 'π' because of the property of 'tan−1' and 'θ' takes two values in the range from zero to 2π for the specific value of S/C. A method for defining this is as follows: First, when the value of S/C is positive, there are a case that both C and S are positive and a case that both C and S are negative. The values of 'θ' in the respective cases are different by π. To differentiate these, referring to each value of C and S, it is known from the expressions (1) and (2) that both C and S are positive in the range of '0<θ<π/2' and both C and S are negative in the range of 'π<θ<(3/2)π'. Therefore, the value of 'θ' can be defined based upon the signs of C and S. On the other hand, when the value of S/C is negative, there are a case that C is positive and S is negative and a case that C is negative and S is positive. The values of 'θ' in the respective cases are different by π. To differentiate these, referring to the values of C and S, it is known from the expressions (1) and (2) that C is positive and S is negative in the range of 'π/2<θ<π' and that C is negative and S is positive in the range of '(3/2)π<θ<π'. Therefore, the value of 'θ' can be defined based upon the signs of C and S.

Practically, the above calculation is executed using the data of D(x) discretely sampled. In this case, if one period is assumed to consist of eight samplings (a sampling interval is assumed to be a phase angle 45°) and each sampled value is D(0), D(1), D(2), D(3), D(4), D(5), D(6), D(7), The output LA to LH of each adding circuit shown in FIG. 4(a) can be utilized as it is.

To correspond to this, if the value of 'cos x' every 45° in one period is assumed to be:
1, s, 0, −s, −1, −s, 0 and s
the value of 'sin x' every 45° in one period is assumed to be:
0, s, 1, s, 0, −s, −1 and −s
s=cos 45°=sin 45°=0.707. C in the expression (1) is calculated as:

$$C=D(0)\times 1+D(1)\times s+D(2)\times 0+D(3)\times(-s)+D(4)\times(-1)+D(5)\times(-s)+D(6)\times 0+D(7)\times s$$

and S in the expression (2) is calculated as $$S=D(0)\times 0 \text{ and } D(1)\times s+D(2)\times 1+D(3)\times s+D(4)\times 0+D(5)\times(-s)+D(6)\times(-1)+D(7)\times(-s)$$

Therefore, 'θ' can be obtained in an expression, θ=tan−1 (S/C) as the expression (3). The above indefiniteness by π can be removed based upon the signs of C and S.

When an interval between cells of the line sensor 5 shown in FIG. 2 is 10 μm and an interval between groups is 80 μm, 80 μm which is one period of the cell array of this line sensor corresponds to one period 1 of the periodic function D(x) shown in FIG. 4(b). Therefore, if the center of the cell A1 at the left end of the line sensor shown in FIG. 2 is assumed to be a reference point and distance to the center (practically, the peak of the curve shown in FIG. 2) of the light source 6 measured from this reference point is assumed to be L, L can be obtained in an expression:

$$L=80 \ \mu m \times (G-1) + 80 \ \mu m \times \theta / 360$$

'G' in the above expression means a number of a group in which the center of a spot (the peak of the curve shown in FIG. 2) obtained in FIG. 3(b) is included. In the above example, G=2, because the center of a spot is in the range of the group G2.

However, practically, the light source 6 is moved between two points, the above L is calculated at the two points and distance between the two points is obtained based upon the difference. If the variable of a phase angle when the light source is moved from one point to another point in the same group is 153.25° for example, distance between these two points is "80 μm×153.25°/360=114.06 μm" and an error is approximately 0.013 μm. If a value obtained by multiplying the difference between group numbers by 80 μm is added in case two points are included in different groups, distance between the two points can be obtained. Such positional measurement can be applied to the measurement of a position and distance using a microscope and the precise detection of a position in a semiconductor device manufacturing apparatus.

In the above embodiment, a phototransistor is used for a light receiving device, however, a line sensor consisting of a photodiode, CCD and the like can be also utilized. If a CCD sensor is used, a signal from the CCD sensor is sent to a memory each address of which corresponds to each cell of the CCD sensor after it is converted from analog to digital, required image processing and others are executed and operation for obtaining a phase to a peak value and distance from a reference point is digitally executed based upon a periodic function as described in the description of a second embodiment.

Two-dimensional positional measurement is enabled by providing the position measuring apparatus in the first embodiment both on x-axis and on y-axis on two-dimensional orthoganal coordinates (x-y coordinates) and operating on both axes as described above and the above position measuring apparatus can be readily developed into a two-dimensional position measuring apparatus.

Figure 5:
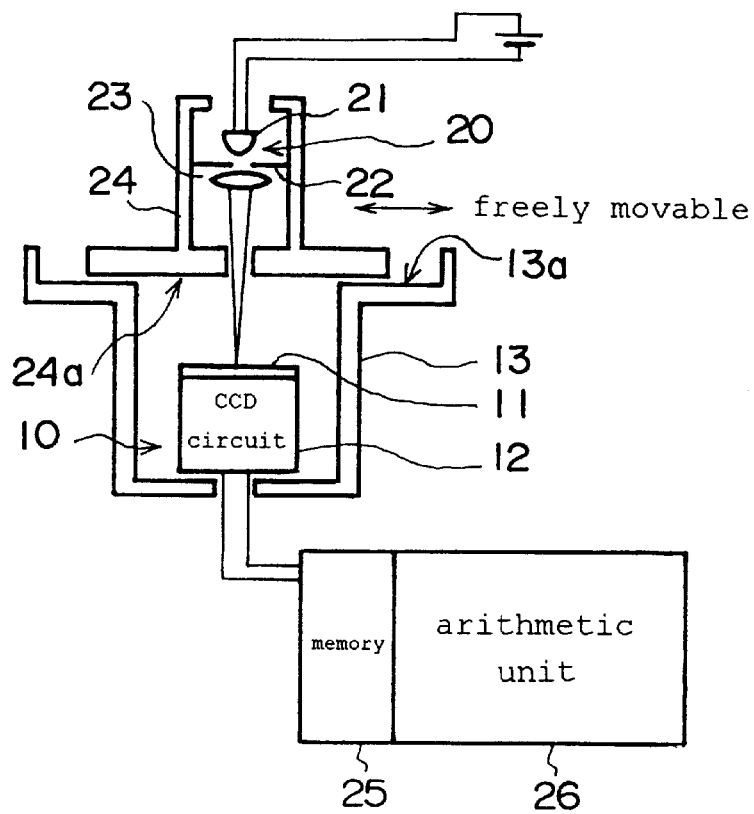
FIG. 5 is a schematic sectional view showing a second embodiment.

Next, a second embodiment will be described. FIG. 5 is a schematic sectional view showing a position measuring apparatus according to a second embodiment. As shown in FIG. 5, a light receiving part 10 consists of a CCD sensor 11 in which multiple CCD cells are two-dimensionally arranged in a predetermined position and a CCD circuit 12 for converting analog signal from this CCD sensor 11 to digital signal and outputting it to an external device. This light receiving part 10 is fixed on a light receiving part case 13 integrally.

A light emitting part 20 consists of a light emitting diode (LED) 21 as a light emitting device, a diaphragm 22 for changing light from this LED 21 to a point light source and a lens 23 for suitably focusing light from this point light source. This light emitting part 20 is fixed on a light emitting part case 24 integrally.

A signal output from the CCD circuit 12 is supplied to a memory 25 each address of which corresponds to each cell of the CCD sensor 11 and temporarily stored. An arithmetic unit 26 executes the image processing of these data if necessary and operates as in the first embodiment to obtain the relative position of the light receiving part case 13 and the light emitting part case 24. In this case, to detect a two-dimensional position, one-dimensional operation in the first embodiment is required to be executed for each axis on plane orthogonal coordinates (x-y coordinates). As the operation of a digitized signal is executed in this embodiment, technique such as discrete Fourier transform is applied to this embodiment.

The half-width of the intensity distribution of the spot of light radiated from LED 21 on the CCD sensor 11 is required to be in a predetermined range, for example approximately the width of a few cells of the CCD sensor 11 for the same reason as in the first embodiment. The size of such a spot can be changed by adjusting the diaphragm 22 and the lens 23.

The upper face 13a of the light receiving part case 13 and the bottom 24a of the light emitting part case 24 are parallel each other and they are in contact with each other or are always held close at a fixed interval. Further, the light receiving part case 13 and the light emitting part case 24 can be freely moved in parallel with the faces in a predetermined range with the upper face 13a and the bottom 24a held in parallel. Therefore, the spot of light radiated from LED 21 on the CCD sensor 11 is moved on the surface of the CCD sensor 11 due to the relative movement of the light receiving part case 13 and the light emitting part case 24.

In an actual positional measurement, the light emitting part case 24 is fixed on an object to be measured and the light receiving part case 13 is fixed on something which functions as the reference of measurement or the light emitting part case 24 is fixed on something which functions as the reference and the light receiving part case 13 is fixed on an object to be measured. For example, if a position detecting apparatus in this embodiment is applied to a machine tool such as a numerically controlled machine, the light emitting part case 24 can be fixed on a stage and the light receiving part case 13 can be fixed on the body of a machine tool. Therefore, if a position detecting apparatus is first calibrated on a stage, the distance and the direction of the movement of the stage and position coordinates are readily and precisely obtained by the position detecting apparatus in this embodiment. On the contrary, it need scarcely be said that if the light receiving part case 13 is fixed on a stage and the light emitting part case 24 is fixed on the body, the similar effect can be also obtained. The position detecting apparatus in this embodiment can be applied to the measurement of a position and distance in a microscope or the precise detection of a position in a semiconductor device manufacturing apparatus as in the first embodiment.

As a modified embodiment of this embodiment, an optical sensor such as a photosensor and a phototransistor may be also arranged on a plane in place of a CCD arranged on a plane for measuring a two-dimensional position.

Figure 6:
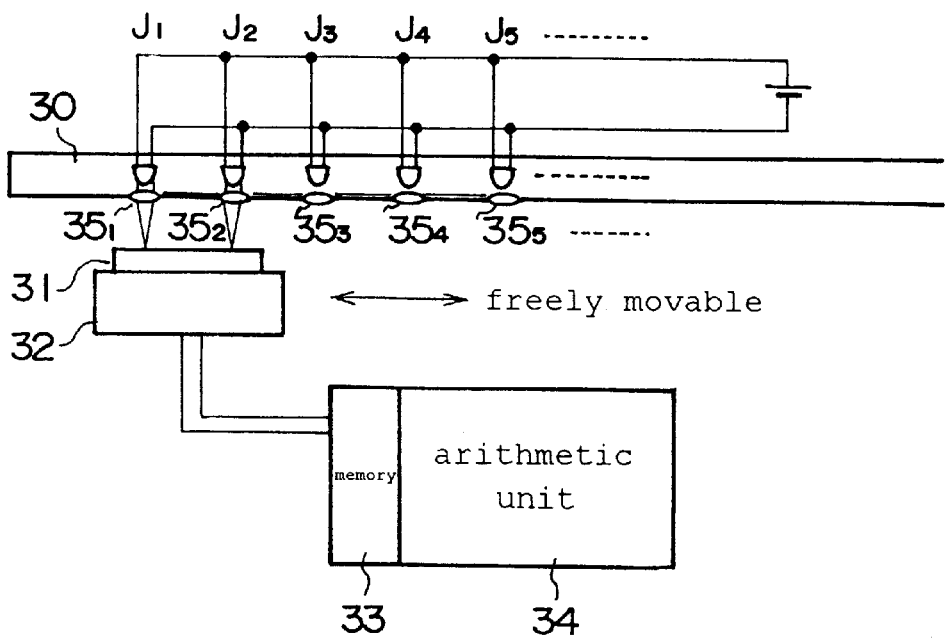
FIG. 6 is a schematic sectional view showing a third embodiment.

FIG. 6 is a schematic sectional view showing a third embodiment. The first and second embodiments are suitable for positional measurement in a relatively small range, however, a third embodiment is characterized in that a position can be also precisely detected in an extremely large range. A light emitting part case 30 shown in FIG. 6 is fixed on an object to be measured and a light receiving part case 31 is fixed on something which functions as the reference of positional measurement. They can be freely moved in parallel with the faces with them opposite. The output of a CCD sensor 31 is temporarily stored in a memory 33 each address of which corresponds to each cell of the CCD sensor 31 after the output of the CCD sensor 31 is converted from analog to digital by a CCD circuit 32 and predetermined operation such as the calculation of a phase is executed after image processing and obtaining a periodic function by an arithmetic unit 34.

Light sources J1, J2, J3, - - - are provided close to the surface of the light emitting part case 30 and opposite to the CCD sensor 31 at a substantially fixed interval and light emitted from each light source is incident on the CCD sensor 31 through the corresponding lenses 351, 352, - - -. This interval is required to be in the range larger than the half of the width of the CCD sensor 31 for example which does not exceed the width of the CCD sensor 31. According to this, even if the light emitting part case 30 is moved anyway, the CCD sensor 31 always receives light from any light source and light from the adjacent light source is necessarily radiated on the CCD sensor 31 in any position. However, light from three light sources is never simultaneously radiated on the CCD sensor 31.

A method for detecting a position by the apparatus shown in FIG. 6 will be described below. For simplicity, it is assumed that the light sources J1, J2, J3, - - - are linearly arranged and the light emitting part case 30 is also linearly moved one-dimensionally and one-dimensional positional detection will be described below. However, if the light emitting part case is two-dimensionally moved, this concept can be also applied.

First, an origin is set in the range in which the CCD sensor 31 can receive light from the light sources J1 and J2 for example, the coordinates of J1 and J2 are obtained by the same method as in the second embodiment, and further, distance between the light sources J1 and J2 is obtained by operation. When the light emitting part case 30 is moved from the origin and the CCD sensor 31 receives light from the light source J3 in addition to light from the light source J2, the coordinates of the light sources J2 and J3 and distance between them are obtained by the same method. When the light emitting part case 30 is moved and the CCD sensor 31 receives light from two light sources, the similar operation is repeated and distance between adjacent light sources formerly obtained is added (subtracted in the case of movement in the reverse direction). According to this, if the light emitting part case 30 is greatly moved, precise positional measurement in the large range is also enabled.

As the coordinates and the position of adjacent light sources are constantly detected and added in the third embodiment shown in FIG. 6 as described above, the slight dislocation of a light source has no effect on positional measurement as long as the above conditions are met. This is a practical advantageous point. In this embodiment, if light from two light sources is radiated on the CCD sensor 31, the positions and the coordinates of these are required to be simultaneously and individually obtained and therefore, after a signal from the CCD sensor is converted from analog to digital as in the second embodiment, it is sent to a memory and operated. A method of directly adding using an operational amplifier circuit to obtain a periodic function as in the first embodiment cannot be applied to the third embodiment as it is. However, if a sensor is divided into a plurality of parts and calculation is respectively independently executed, the position of two light sources can be obtained as in the first embodiment.

Figure 7:
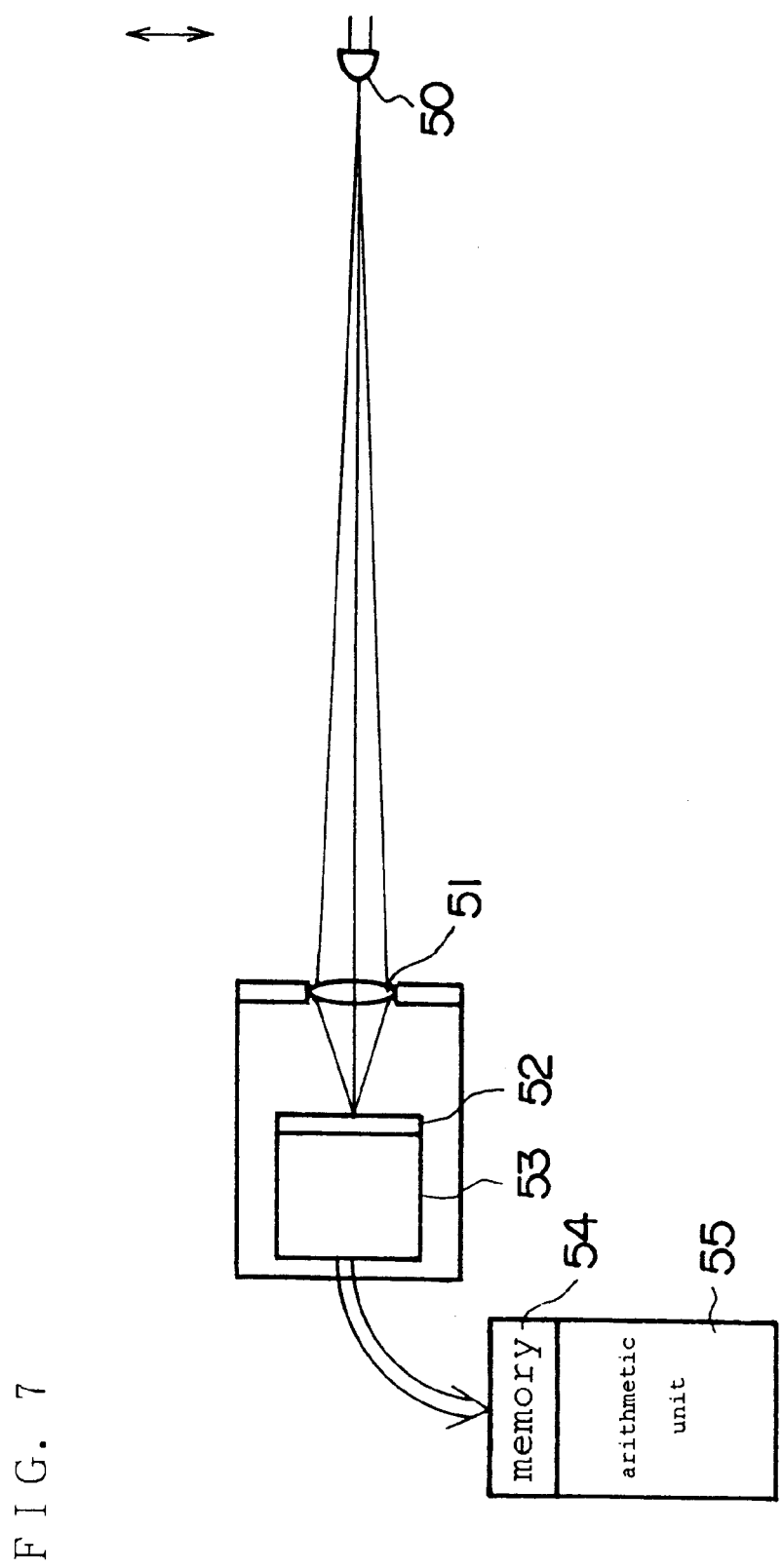
FIG. 7 is a schematic drawing showing a fourth embodiment.

FIG. 7 is a schematic drawing showing a fourth embodiment. The main object of the first to third embodiments is to precisely obtain the one-dimensional or two-dimensional position of LED which is light emitting means, however, as the position of light emitting means can be detected at high speed and precisely by the above method, the method can be applied in various fields. FIG. 7 shows such a concept and an example in which such a concept is applied to precisely detect the waveform of an oscillated object.

When an aural signal is supplied to a speaker and a oscillating part is oscillated, a marker 50 attached on the surface of oscillating part is also oscillated and the position of the marker is changed. For the marker 50, a light emitting device such as LED may be used. The positional change of this marker 50 reaches a CCD sensor 52 through a lens 51 as an optical signal. After the output of the CCD sensor 52 is converted from analog to digital by a CCD circuit 53, it is temporarily stored in a memory 54 each address of which corresponds to each cell of the CCD sensor 52, image processing for recognizing the image of the marker 50 is executed by an arithmetic unit 55, and further, predetermined operation such as the calculation of a phase is executed. To correspond to oscillation in a high frequency domain which cannot be followed by CCD, a phototransistor may be used as in the first embodiment shown in FIGS. 2 and 3.

The CCD sensor 52 receives light from the marker and can detect the positional change of the marker 50 precisely as time series by the same method as in the first embodiment. The change of the position of the marker 50 detected as described above shows an aural waveform given from the speaker itself. Therefore, it can be precisely examined how an original aural signal is changed and distorted via an audio system and a speaker by comparing the waveform of an aural signal supplied to an audio speaker and a waveform obtained by operating the output of the CCD sensor 51.

If CCD 52 is used, the similar waveform can be observed by providing a mark such as a white mark which can be definitely differentiated in place of providing a light source such as LED 50 to a speaker because an image can be caught, taking the image of this mark in CCD and providing means for recognizing the image of the mark based upon this picture signal. In this case, the brightness of the mark itself needs to be changed depending upon a location and a lens needs to be justly focused so that the intensity distribution of an image caught by the CCD sensor 52 is suitably expanded.

As another example, the vibrating waveform expressed by an engine of an automobile can be readily, precisely and promptly observed by attaching the marker 50 shown in FIG. 7 on the engine. Therefore, when it is analyzed how vibration is changed by its rotating speed and other parameters, this apparatus can be utilized.

Figure 8:
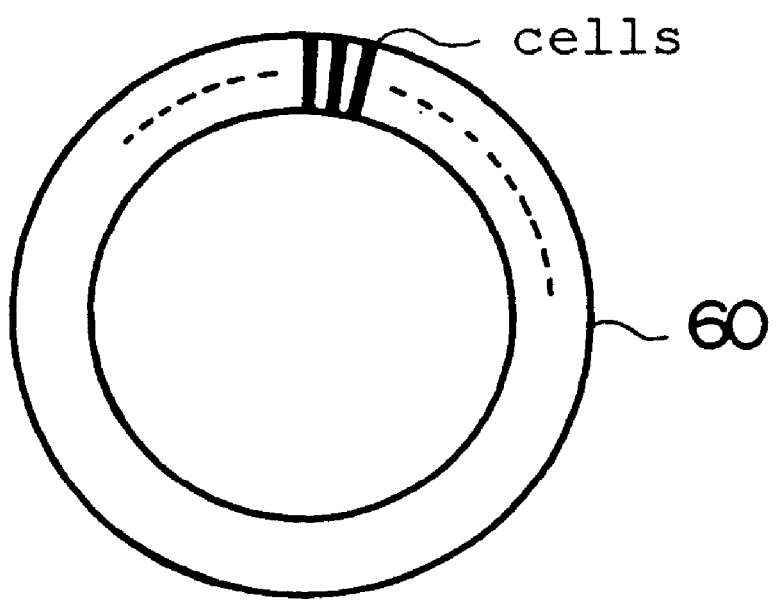
FIG. 8 explains a fifth embodiment.

FIG. 8 explains a fifth embodiment. Though one-dimensional or two-dimensional position is obtained in the above embodiments, if an object to be measured is a rotor, the angle of the rotation of the object can be also obtained by applying the similar principle. For one method in that case, a light source is fixed on the rotor which is an object to be measured and cells in a light receiving part 60 are arranged in a circle as shown in FIG. 8 along a path in which the light source is moved due to the rotating operation of the rotor. As the spot of light radiated from the light source is moved on cells arranged in a circle when the rotor is rotated, the angle of the rotation of the rotor can be detected by obtaining the relative position of the light source and the light receiving part.

In the above first to fifth embodiments based upon a single light source system, various variations are allowed. For example, as means for defocusing light irradiated a CCD sensor, a scattering plate may be provided close to the surface of the CCD sensor in parallel in place of adjusting the lens provided on the side of the light source and light from the light source can be incident on this. Or the same effect can be obtained by providing a light source with suitable intensity distribution and justly focusing it on the side of the CCD sensor.

Further, though a measurement of a position and a distance (or a length) is described in the above embodiments, the present invention can also be applied to the measurement of physical quantity other than a position and a distance. For example, in a measuring method in which a position pointed by a pointer is changed depending upon mass such as a balance and a spring balance, mass can be precisely measured by applying the present invention to the measurement of this position and precisely measuring it. Or if a distance between two oscillating objects is required to be precisely obtained, the object can be achieved by measuring the precise positions of them respectively by applying the present invention and obtaining the difference of them.

Figure 9:
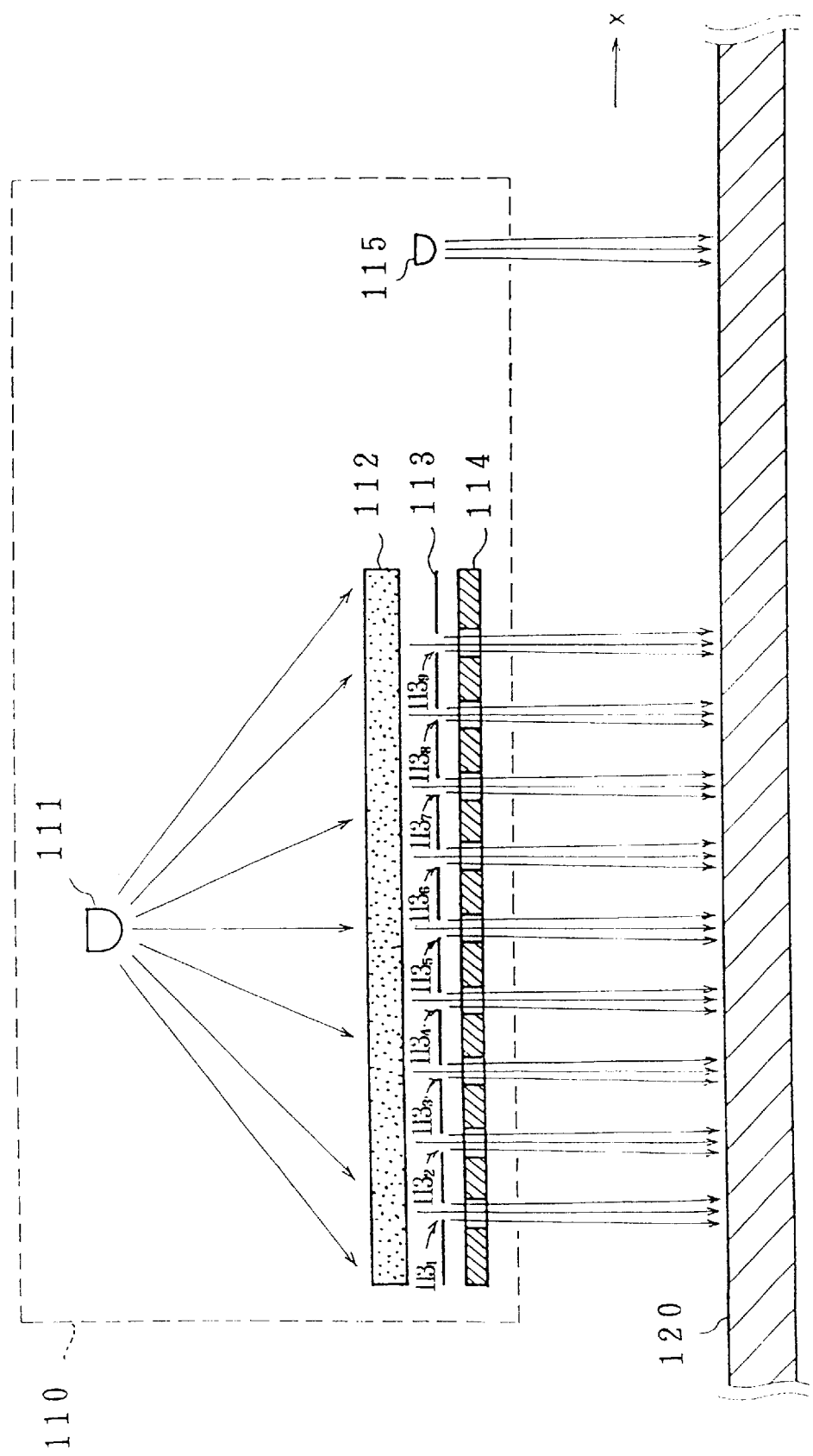
FIG. 9 is a schematic sectional view showing the main part of a position measuring apparatus of a sixth embodiment.

Next, sixth to eighth embodiments based upon "a plurality of light source system" will be described. FIG. 9 is a schematic sectional view showing light source means which is the main part of a position measuring apparatus equivalent to a sixth embodiment and is provided opposite to CCD which is light receiving means and the surface of this CCD.

As shown in FIG. 9, a light source part 110 consists of a light emitting device 111, a scattering plate 112, a slit mask 113, a lens array 114 and a light emitting device 115 provided separately from the light emitting device 111. For the light emitting devices 111 and 115, for example LED is used.

Light emitted from the light emitting device 111 is suitably scattered by the scattering plate 112 and transmitted. Light which passes through any of nine slits 1131 to 1139 provided to slit masks 113 of the above light is incident on the surface of CCD 120 which is the light receiving means by the lens array 114. Therefore, when the light source part 110 is viewed from the side of CCD 120, the above state is equal to a state in which nine light sources 1131 to 1139 are provided. Meantime, light from the light emitting device 115 does not pass through the slit mask 113 and it is provided in a position sufficiently far from the light emitting device 111 so that the above light is directly incident on the surface of CCD 120. Distance between the light emitting devices 111 and 115 is adjusted in advance so that it is predetermined one.

The light source part 110 is opposite to the surface of CCD 120 and can be freely moved in parallel with CCD 120 (in the direction of x-axis). When distance or a relative position is actually measured, one is on the fixed side and the other is on the moved side of the light source part 110 and CCD 120. Here, the light source part 110 is on the moved side and CCD 120 is on the fixed side. In this embodiment, an interval between cells provided on the surface of CCD 120 is set to 10 μm. CCD 120 is grouped so that serial eight cells are in the same group. The position of the light source part 110 in one group is called "a small address" and the position in units of group of a cell to which the light source part is opposite on the surface of CCD 120 is called "a large address. The light emitting device 111 in the light source part 110 is for observing a small address, the light emitting device 115 is for observing a large address, if a small address is required to be obtained, only the light emitting device 111 is put on and the light emitting device 115 is put off, and if a large address is required to be obtained, only the light emitting device 115 is put on and the light emitting device 111 is put off.

An interval between adjacent slits of the slit mask 113 is set to 80 μm. Hereby, distance between peaks of the intensity distribution of light which is incident on the surface of CCD 120 is equal to an interval between the corresponding cells in adjacent groups. For such a slit mask, for example, a photographic film may be used in which a vertically striped pattern or a horizontally striped pattern (a slit pattern) is formed by arranging a transparent area and an opaque area alternately. A slit pattern in which a transparent area and an opaque area are alternately arranged at the interval of 80 μm can be readily obtained by well-known technique.

On the other hand, light from the light emitting device 115 is directly incident on the surface of CCD 120 without passing through the slit mask.

Figure 10:
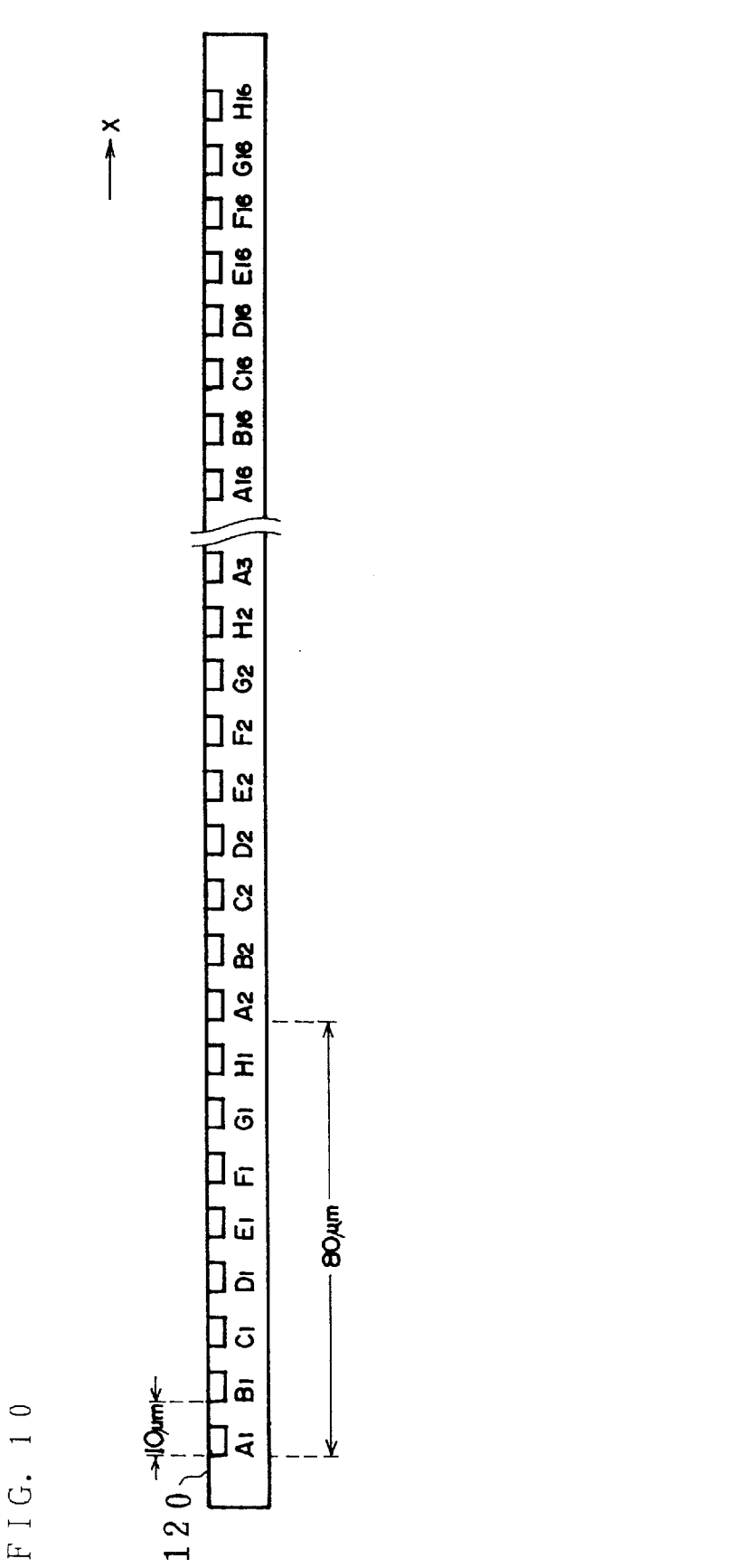
FIG. 10 is a schematic sectional view enlarging the main part shown in FIG. 9.

FIG. 10 is a schematic sectional view showing an enlarged part of the surface of CCD 120 shown in FIG. 9. As shown in FIG. 10, A1, B1, - - - denotes each cell linearly arranged at the interval of 10 μm on the surface of CCD 120 and in this case, to simplify, 128 cells A1, B1 - - -, G16, H16 are provided. Cells are divided into sixteen groups with serial eight cells grouped as the same group as eight cells A1 to H1 form a group G1, eight cells A2 to H2 form a group G2, - - -, eight cells A16 to H16 form a group G16. Therefore, the length of one group is 80 μm.

Figure 11:
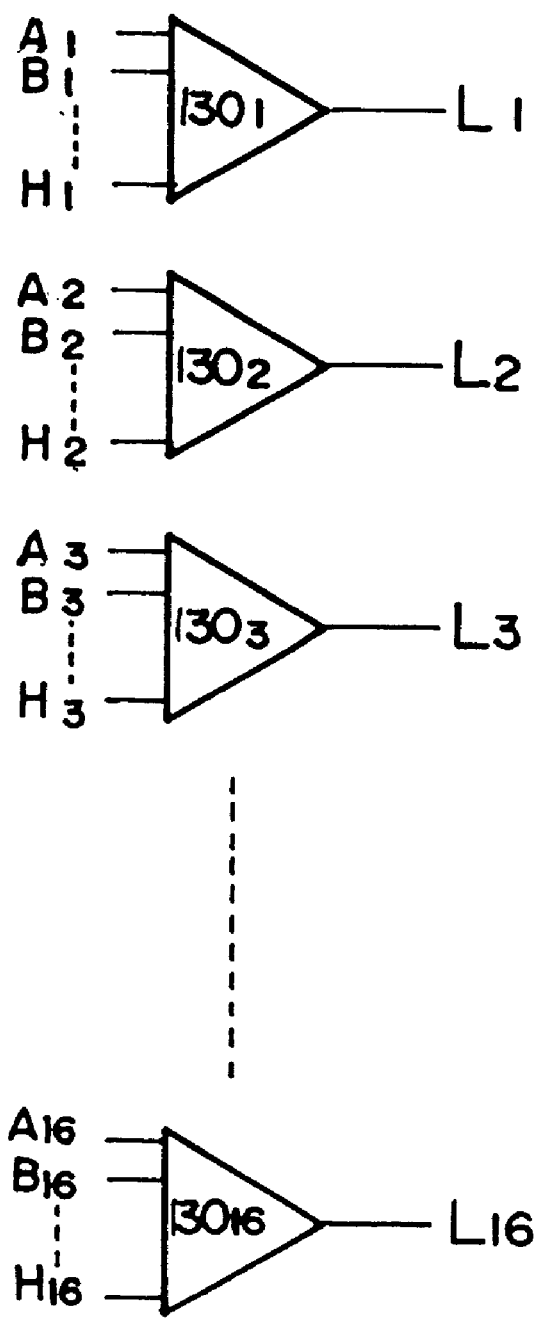
FIGS. 11 to 13 explain a method of obtaining "a large address" in the sixth embodiment.

First, referring to FIGS. 11 to 13, a method of obtaining a large address will be described. FIG. 11 corresponds to FIG. 3(a) which describes a single light source system, FIG. 12 corresponds to FIG. 2 and FIG. 13 corresponds to FIG. 3(b).

A position measuring apparatus in this embodiment is provided with adding circuits 1301 to 13016 shown in FIG. 11. These adding circuits 1301 to 13016 are provided corresponding to the respective groups of cells in CCD 120, signals output from cells included in the same group is added for every group and outputs L1 to L16 are output. To obtain a large address, when the light emitting device 111 is put off and only the light emitting device 115 is put on, the intensity distribution is like a curve 132 shown in FIG. 12 for example. FIG. 12 shows a case that the light emitting device 115 is located in the range of the group G13. At this time, the output L1 to L16 of the adding circuits 1301 to 13016 is like FIG. 13 and the output L13 of the adding circuit 13013 is the largest. Therefore, it is detected that the light emitting device 115 is located opposite to the group G13 by comparing these signals L1 to L16 by an arithmetic circuit not shown and a large address can be obtained based upon this.

If the light emitting device 115 is located in another position, a large address can be similarly obtained. Actually, after a signal output from each cell of CCD 120 is converted from analog to digital, it is sent in a memory each address of which corresponds to each cell of CCD and digitally operated. However, the detailed description of an A/D converter and others is omitted.

Figure 14:
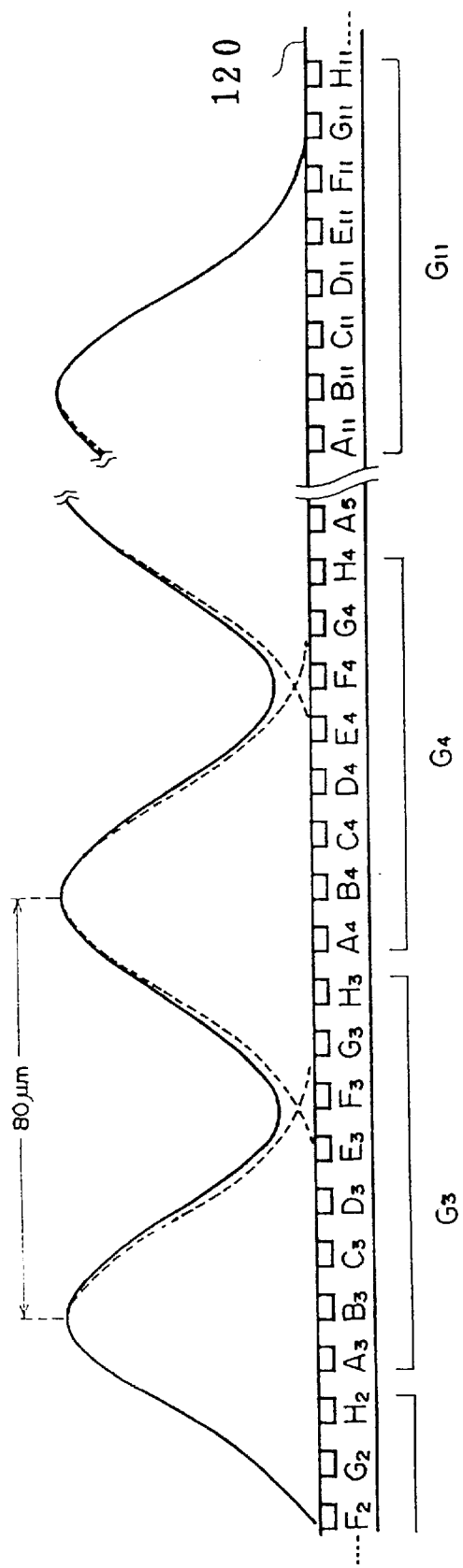
FIG. 14 shows the intensity distribution of light on the surface of a charge-coupled device (CCD) in the sixth embodiment.

Next, a method of obtaining a small address will be described. As shown in FIG. 9, as light which passes through each slit 1131 to 1139 of the slit mask 113 is formerly suitably scattered by the scattering plate 112, it is incident on the surface of CCD 120 as a bundle of rays with broadening of a certain angle. Therefore, the intensity distribution of a bundle of rays which passes through one slit on the surface of CCD 120 is bilaterally symmetrical with each slit as the center. FIG. 14 shows an example of this intensity distribution. As shown in FIG. 14, each curve shown by a broken line over CCD 120 shows the intensity distribution of a bundle of rays which passes through one slit of the slit mask 113. An actual intensity distribution in which these curves are superposed is shown by a solid line and this distribution reaches a peak at the interval of 80 μm as described above. This interval is equal to the width of one group and therefore, the output of the corresponding cells in respective groups is equal.

The broadening of a bundle of rays which passes through each slit (for example, the half-width in which the intensity of a bundle of rays falls to half of the peak value) is approximately the width of a few cells of CCD for the same reason as in the case of a single light source system and in the concrete, when the number of cells included in a group is 'q', it is desirable that the broadening of a bundle of rays is in the range from the length equivalent to approximately q/3 pieces of cells to the length equivalent to q pieces of cells. Therefore, the position of the lens array 114 in the light source part 110 defocus to become slightly underfocus or overfocus so that the width of a spot is approximately equal to that of a few cells.

FIG. 15 shows an adding circuit for adding signals output from the corresponding cells in respective groups of CCD 120 shown in FIG. 10 and corresponds to FIG. 4(a) which explains a single light source system. That is, the adding circuit 140A adds the output of the cell A1 in the group G1, the output of the cell A2 in the group G2, - - - , the output of the cell A16 in the group G16 and outputs. Adding circuits 140B to 140H similarly add signals output from the corresponding cells in each group. The output of the adding circuits 140A to 140H is respectively OA to OH. Actually, after a signal output from each cell of CCD 120 is converted from analog to digital, it is sent to a memory each address of which corresponds to each cell of CCD and digitally operated, however, the detailed description of an A/D converter and others is omitted.

First, a method of obtaining the relative position of the light source part 110 and CCD 120 based upon only a bundle of rays which passes through one slit will be described. It is assumed that only a slit mask 1311 is provided to the slit mask 113 shown in FIG. 9 and another slit is not provided. When the output OA to OH of each adding circuit 140A to 140H shown in FIG. 15 obtained in a case assumed as described above is arranged on x-axis at an equal interval, a curve D1(x) in the shape of a periodic sinusoidal wave shown in FIG. 16(a) can be obtained. In this case, the output OA of the adding circuit 140A for example corresponds to the value of a point A on the vertical axis. The output of other adding circuits is also similar. FIG. 16(a) corresponds to FIG. 4(b) which explains a single light source system. One period from the point A to a point H corresponds to the actual length of one group consisting of cells of CCD 120, 80 μm.

When such a periodic function D1(x) is obtained, a phase θ1 from the reference point A determined for convenience in FIG. 16 to a peak can be readily and precisely obtained using a well-known arithmetic circuit not shown. As a method of obtaining the phase θ1 is the same as the one described in relation to a single light source system referring to FIG. 4(b), the description is omitted.

Effect produced by providing a plurality of light sources (a slit 1131 and others in FIG. 9) will be described below. It is described above that only a single slit 1131 is provided to a slit mask 113 shown in FIG. 9. Similarly, assuming that only a single slit is provided to respective slits 1132 to 1139 and another slit is not provided, the same periodic functions D2(x) to D9(x) as the above one and in FIG. 16(a) can be considered. As each slit 1131 to 1139 provided to the slit mask 113 is provided at the interval of 80 μm, the phases of the rest of the periodic functions D2(x) to D9(x) are equal to that of the periodic function D1(x) shown in FIG. 16(a).

However, it is not true that a single slit is provided to the slit mask 113, but actually, nine slits 1131 to 1139 are provided. The actual intensity distribution of light on the surface of CCD 120 is also in a state in which light through each slit is superposed as shown by a solid line in FIG. 14. Therefore, when the output of the adding circuits 140A to 140H shown in FIG. 15 is shown as in FIG. 16(a), a periodic function DT(x) shown in FIG. 16(b) is represented. This is a signal waveform equivalent to that in which nine periodic functions D1(x) to D9(x) are superposed. The amplitude of this periodic function DT(x) is very large, compared with that of the periodic functions D1(x) to D9(x) shown in FIG. 16(a).

Therefore, the phase of the peak of the periodic function DT(x) can be obtained by the same method as the one of obtaining the phase of the peak of D1(x) based upon light from a single slit. At that time, if a phase is obtained based upon intensity distribution in which light through each slit is superposed because the amplitude of DT(x) is very large, compared with that of D1(x), D2(x), - - - , D9(x), the distortion of each signal waveform is set off and as a result, a waveform very close to a sinusoidal wave can be obtained as a result of each signal being superposed as shown in FIG. 16(b) even if the intensity distribution of light through each slit is not bilaterally symmetrical precisely or the width of each slit includes a slight error. This means signal-to-noise (SN) ratio is greatly enhanced, compared with a case of a single slit. Therefore, more precise measurement of a phase and further, more precise measurement of distance are enabled. As clear from the above description, as the precision of measuring a phase is enhanced as much if the number of slits is increased, the number of slits can be determined considering a desired precision.

When a large address and a small address are obtained as described above, the relative position of the light source part 110 and CCD 120 is determined based upon predetermined distance between the light emitting devices 111 and 115. That is, if distance or the length between specific two points is required to be obtained, the respective positions of the two points on x-axis are obtained and the difference between these is obtained. For example, assume that the phase of a first point is $\mu$1 and a small address proves to be 30 mbased upon this. In the meantime, assume that the phase of a second point to which the distance from the first point is obtained is θ2 and a small address proves to be 50 $\mu$m based upon this. Assume that the large address of the second point is larger by 3, compared with that of the first point. In this case, distance between the first and second points proves to be 240 $\mu$m when calculated according to an expression, 3×80 $\mu$m+(50 $\mu$m−30 $\mu$m)=240 $\mu$m.

This embodiment is equivalent to a one-dimensional position measuring apparatus, however, a two-dimensional position can be measured by respectively providing this apparatus in the direction of x-axis and the direction of y-axis on two-dimensional orthogonal coordinates (x-y coordinates) and respectively executing the same operation as described above and the above apparatus can be readily developed into a two-dimensional position measuring apparatus.

FIG. 17(a) is a schematic sectional view showing the modified embodiment of the sixth embodiment and FIG. 17(b) is a schematic plan showing an enlarged part of a mask used this light source part. Though in the light source part 110 shown in FIG. 9, the light emitting device 115 is provided apart from the light emitting device 111, in a light source part 150 shown in FIG. 17(a), a light emitting device 151 for measuring a small address and a light emitting device 155 for measuring a large address are provided close. A mask 153 is formed by a photographic film and density modulation is applied to this photographic film as described later. The mask 153 is closer to the surface of CCD 120, compared with the slit mask 113 shown in FIG. 9 and can be moved in parallel with CCD 120 together with the light emitting devices 151 and 155. There is an advantage that thermal adhesion between the mask 153 and CCD 120 is enhanced by bringing them close as described above and dislocation caused by thermal expansion can be minimized.

In this case, for example, the light emitting device 151 is blue and the light emitting device 155 is red. Light from the light emitting device 151 is radiated on the mask 153 in the range with a large angle shown by a dotted line in FIG. 17. In the meantime, light from the light emitting device 155 is focused in the range of a suitable angle by a lens 154 so that it is a spot with substantially the same intensity distribution as the curve 132 shown in FIG. 12 on the surface of CCD 120.

The mask 153 is formed by a photographic film and shading of red the density of which varies in the shape of a sinusoidal wave shown by 153a in FIG. 17(b) is applied to the film (called density modulation). The period of this density modulation is 80 $\mu$m. When blue light from the light emitting device 151 is radiated on such a slit, the transmission factor of blue light is low in a part in which the density of red is high and the transmission factor of blue light is high in a part in which the density is low. Therefore, the intensity of red light which transmits this mask 153 is varied in the shape of a sinusoidal wave shown by a solid line in FIG. 14, corresponding to the period of density modulation. Therefore, the mask 153 plays the same role as a combination of the scattering plate 112, the slit mask 113 and the lens array 114 shown in FIG. 9 for the blue light emitting device 151 and therefore, the measurement of a small address is enabled based upon light from the light emitting device 151. In the meantime, red light from the light emitting device 155 transmits the mask 153 provided with variable-density red at the same transmission factor independent of density modulation. Therefore, light from the red light emitting device 155 forms a luminescent spot on the surface of CCD 120 and the measurement of a large address is enabled based upon this.

FIG. 18(a) is a schematic plan showing a distance measuring apparatus equivalent to a seventh embodiment according to the present invention and FIG. 18(b) is a schematic sectional view showing a state in which the apparatus shown in FIG. 18(a) is viewed from the direction shown by an arrow a. As shown in FIG. 18(a), CCD 160 is divided into four areas 1601 to 1604 and the areas 1601 and 1603 of these contribute to the measurement of distance. In this embodiment, CCD 160 is fixed and a moving member 170 provided on it can be moved two-dimensionally in parallel with CCD 160. The moving member 170 can be freely moved in the range in which its center O is included in an area shown by a broken line in FIG. 11(a).

As shown in FIG. 18(b), on the lower face of the moving member 170, two light sources 180x and 180y are provided. The light source 180x measures the position of the moving member 170 in the direction of x-axis together with an area 1601 of CCD 160. The light source 180y measures the position of the moving member 170 in the direction of y-axis together with an area 1603 of CCD 160. The light sources 180x and 180y can utilize the light source part 110 shown in FIG. 9 or the light source part 150 shown in FIG. 17. In this case, the direction of a slit provided to the slit mask 113 or the mask 153 is different by 900 between the light sources 180x and 180y.

If a distance measuring apparatus shown in FIG. 18 is applied to measuring the length of a specimen to be examined of a microscope for example, an index in a field of view is fitted to one end of a part to be measured of the specimen to be examined and the distance measuring apparatus is reset. By such operation, distance from the point to a point to which the index is fitted next is measured. Therefore, if the index is fitted to the other end of the specimen after reset, distance between the two points is automatically calculated.

FIG. 19(a) is a schematic sectional view showing a distance measuring apparatus equivalent to an eighth embodiment according to the present invention and FIG. 19(b) is a schematic plan showing an enlarged part of a mask used for the light source of this apparatus. A light source part 190 of a distance measuring apparatus in this embodiment is provided with blue (B) LED 191 for measuring a large address, a lens 192, red (R) LED for measuring a small address in the direction of x-axis 194 and green (G) LED for measuring a small address in the direction of y-axis 196, and further, is provided with a special mask 198 shown in FIG.

19(b). In CCD 200, multiple cells are two-dimensionally arranged in the directions of x-axis and y-axis. FIG. 19 is the same as FIG. 17 in that the mask 198 is arranged close to CCD 200, therefore, thermal adhesion between both is enhanced and dislocation caused by thermal expansion can be minimized.

Density modulation is applied to the mask 198 as the mask 153 shown in FIG. 17(b), however, in this embodiment, as shown in FIG. 19(b), density modulation is applied so that in the direction of x-axis, the transmission factor of red light (R) from LED 194 varies as a sinusoidal wave 198a in FIG. 19(b) and in the direction of y-axis, the transmission factor of green light (G) from LED 196 varies as a sinusoidal wave 198b in FIG. 19(b). That is, in the direction of x-axis, the transmission factor of red light is the highest in a position shown by a dotted line and in the direction of y-axis, the transmission factor of green light is the highest in a position shown by an alternate long and short dash line. Further, the transmission factor of blue light (B) from LED 191 is set so that it is fixed on the overall face.

Two-dimensional measurement of a position and distance is enabled as in the apparatus equivalent to the seventh embodiment by the apparatus equivalent to this embodiment because of the above constitution. In this case, if a small address is measured after blue LED 191 is put on and a large address is measured, for example, first red LED 194 is put on, a position in the direction of x-axis is obtained, next green LED 196 is put on and a position in the direction of y-axis is obtained. According to this embodiment, there is an advantage that the dimension of CCD 160 can be reduced, compared with a case of the seventh embodiment shown in FIG. 18.

In the above sixth to eighth embodiments based upon a plural light source system, various variations are allowed. For example, in the above embodiments, a case that CCD is used for a light receiving device is described, however, a light receiving device such as phototransistors or photodiodes may be used. A slit mask is not limited to the above photographic film and something in which a transmitting part and a part for preventing transmission are alternately arranged using minute processing technology used in a semiconductor device manufacturing process for example can be also utilized. Further, in the above embodiments, a case that a plurality of second light sources according to the present invention are obtained utilizing a slit mask provided with a plurality of slits is described, however, the present invention is not limited to this and it need scarcely be said that a semiconductor device wherein a light emitting device is individually formed in a position corresponding to a slit and others may be used. The apparatus equivalent to this embodiment can be applied to various fields other than the above fields including one- dimensional measurement of the length.

Figure 20:
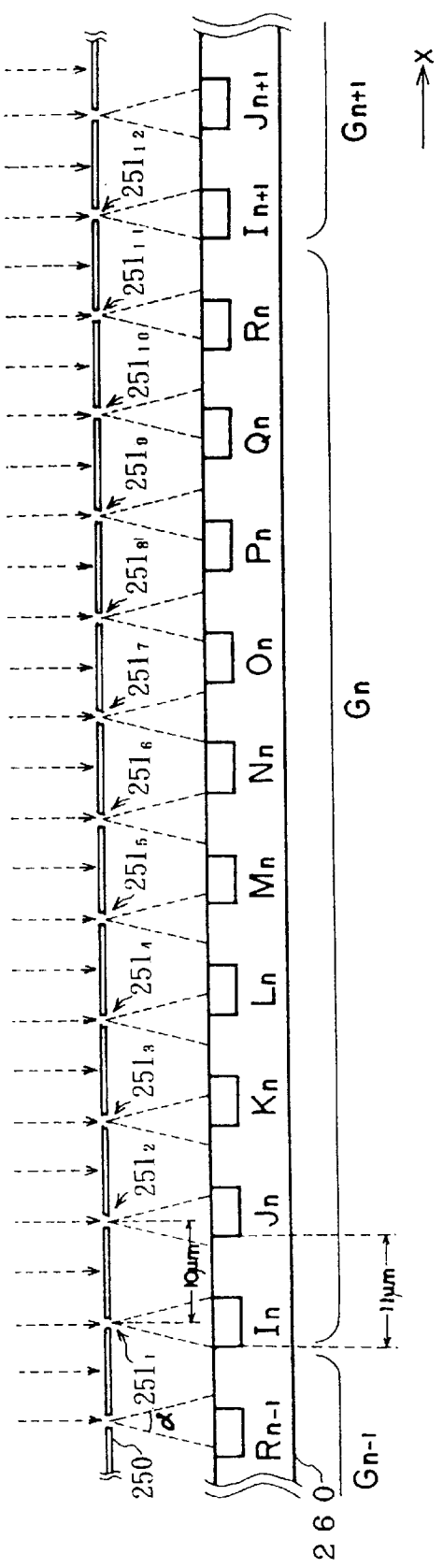
FIG. 20 is a schematic sectional view showing a ninth embodiment.

Next, the ninth to fourteenth embodiments based upon "a slight difference system" will be described based upon the above description of the plural light source system. FIG. 20 is a schematic sectional view showing a position measuring apparatus based upon a slight difference system equivalent to a ninth embodiment. Referring to FIG. 20, assume that if the relative position of a slit mask 250 for one-dimensional CCD 260 is considered, an address showing which position a specific cell in CCD 260 is located in units of an interval between slits is called "a slit address" and an address showing a further detailed position in a slit address is called "a local address".

As shown in FIG. 20, in CCD 260 which is a light receiving part, multiple cells I to R are provided at the interval of 11 $\mu$m and one group is formed by serial ten cells. The alphabetical character of a group in which a cell is included is allocated to each cell. For example, an alphabetical character G and a subscript n are allocated to each cell included in a group Gn. In the meantime, multiple slits are provided to a slit mask 250 included in a light source part at the interval of 10 $\mu$m. A suitable light source not shown is integrated with the slit mask 250 over the slit mask 250 and substantially parallel light is incident on the slit mask 250 from this light source. The only light which passes through a slit of such light is incident on the surface of CCD 260 with the broadening of a predetermined angle a. Either or both of CCD 260 and the slit mask 250 are constituted so that they are moved relatively in parallel in the direction of x-axis. In this case, it is also assumed that CCD 260 is fixed and the slit mask 250 is on the moved side.

FIG. 20 shows a state in which one slit 2511 of the slit mask 250 is just over a cell In located at the leftmost position of a group Gn. In this state, the cell In receives the most quantity of receivable light and the output value is the largest (maximum). As an interval between cells and an interval between slits are slightly different, the position of a cell Jn next to the cell In and a slit 2512 just over it is slightly dislocated and the output value of the cell Jn is slightly smaller than the maximum value. Similarly, the output value of a cell is gradually reduced according to progress to the right side in FIG. 20 and the output value of a cell Nn is the smallest. Afterward, the output value is increased and as a result of defining an interval between cells and an interval between slits as described above, one period which is the change of output values is finished at a cell Rn at the rightmost position of the group Gn. A slit 25112 is again just over a cell next to Rn on the right side, that is, a cell In+1 in a group Gn+1 and the output value is again the largest.

Figure 21:
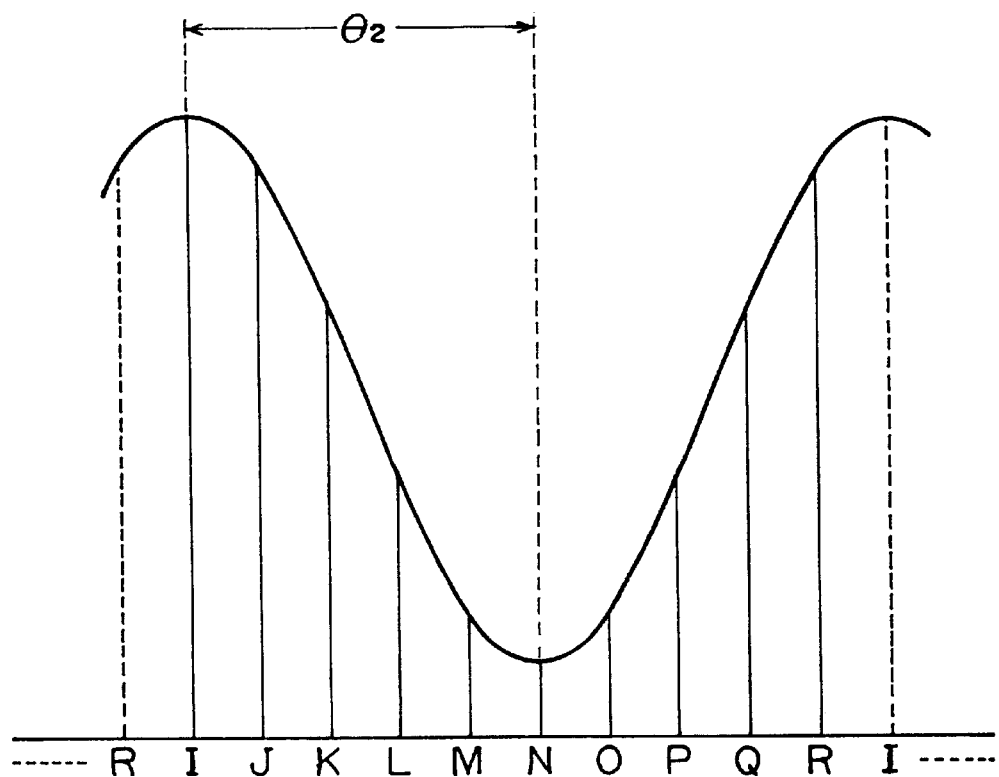
FIG. 21 shows sequentially arranged results added by adding circuits in the ninth embodiment.

The change of the output value of each cell in all the group is equal to that of the output value of each cell in the group Gn because each cell of CCD 260 and each slit of the slit mask 250 are provided at the above interval. That is, when the whole cells are viewed, the output values of them vary as a sinusoidal wave with the length of a group as one period. When the output value of cells included in each group is respectively added by ten adding circuits I to R not shown as in FIG. 15 described in relation to "a plural light source system", the result forms a sinusoidal wave with a larger amplitude and the same period. FIG. 21 shows the result of this adding operation arranged in order. The value of 'I' shown in FIG. 21 shows "I1+I2+ - - - In+ - - - ". The cases of J to R are similar. As described above, when the output value of each adding circuit is arranged, a periodic function shown in FIG. 21 can be obtained.

It will be considered how the output value of the cell In varies when CCD 260 is fixed as shown in FIG. 20 and the slit mask 250 is gradually moved left. When the slit mask 250 is moved left, the slit 2511 just over it is moved left and as a result, the quantity of light received by the cell In is gradually reduced. When the slit mask 250 is moved by approximately 5 $\mu$m, the quantity of light received by the cell In is the smallest. However, as the effect of light from the next slit 2512 is increased when the distance of movement exceeds 5 $\mu$m, the quantity of light received by the cell In is increased. When the slit mask 250 is moved by 10 $\mu$m, the slit 2512 is just over the cell In and the cell In again receives the most receivable light.

Therefore, the output value of the cell In varies by one period at every 10 $\mu$m long while the slit mask 250 is moving. It is similar in the cases of the other cells Jn to Rn that the output value of a cell varies by one period every time the slit mask 250 is moved by 10 µm. Therefore, the phase of a signal output from each cell is different by degrees among In to Rn. As a result, it is known that sinusoidal wave shown in FIG. 21 also varies by one period every time the slit mask 250 is moved by 10 µm. This shows actual distance corresponding to one period of a sinusoidal wave shown in FIG. 21 is 10 µm.

As clear from the above description, if the output value of a specific cell, for example the cell In shown in FIG. 20 is always monitored, the output value reaches a peak every time the slit mask 250 is moved by 10 µm. Therefore, the slit address of CCD 260 for the slit mask 250 can be obtained by converting an output value into a pulse signal using predetermined circuit means and counting the number of pulses.

In the meantime, a local address can be obtained by the following procedure: In this case, the same procedure as the procedure of a method of obtaining the phase θ of the peak from the waveform described in relation to a single light source system and shown in FIG. 4(*b*) and obtaining the relative position between the light source 6 and the line sensor 5 respectively shown in FIG. 2, and that of a method of obtaining the phase θ1 of the sinusoidal wave described in relation to a plural light source system and shown in FIG. 16 and obtaining the relative position of the light source part 110 and CCD 120 shown in FIG. 9 based upon the result can be applied. That is, if the waveform of the periodic function shown in FIG. 21 can be obtained, the phase θ2 of the sinusoidal wave shown in FIG. 21 is obtained by the same procedure as that of the single light source system and the plural light source system and the local address of the slit mask 250 for CCD 260 shown in FIG. 20 is obtained based upon the result. In this case, the phase θ2 shows a phase from the reference, I to a position in which the waveform is the lowest. In that case, its periodic function corresponding to the periodic function D (x) described in the description of the first embodiment is K cos(x−θ2) and its constant K is negative.

Therefore, if a slit address and a local address before movement are obtained, a slit address and a local address after the slit mask 250 is moved for CCD 260 are obtained and the difference between both addresses is obtained, then the precise distance of the movement of the slit mask 250 for CCD 260 is determined. Note that FIGS. 16 and 21 are greatly different in the following: That is, in FIG. 16, one period of the sinusoidal wave corresponds to an interval (80 µm) between groups of CCD 120 shown in FIG. 12, while in FIG. 21, one period of the sinusoidal wave corresponds to an interval (10 µm) between slits of the slit 250 shown in FIG. 20.

The resolution of a phase angle in a plural light source system depends upon SN ratio of the signal waveform shown in FIG. 16(*b*) and the number of samples when the phase angle θ1 is calculated. The number of samples in this case means the number of cells included in one group. That is, when the number of samples is increased, sample points of the sinusoidal wave in one period shown in FIG. 16(*a*) or (*b*) are increased, an interval between A and B is narrowed, as a result the obtained periodic function is smooth and SN ratio is enhanced.

In the meantime, the increase of the number of samples means that actual distance corresponding to one period of the sinusoidal wave shown in FIG. 16(*a*) or (*b*) is extended under a condition that an interval between cells is fixed (10 µm). A small address in a plural light source system can be obtained according to the following expression:

$$l1=10[\mu m] \times m \times \theta1/360. \quad (4)$$

'm' corresponds to the number of cells included in one group, that is, the number of samples and in the case of FIG. 16, m=8. If an interval between cells is fixed (10 µm) even if the number of samples m is increased and the resolution of θ1 is enhanced in case the position of the light source part 110 for CCD 120 is calculated according to this expression, the value of the part, "10 [µm]×m" in the expression (4) is increased and as a result, the resolution of positional calculation is deteriorated as much.

On the other hand, in the slight difference system, one period of the periodic function shown in FIG. 21 can correspond to very short actual distance (10 µm) by arranging eleven slits of the number slightly different from the number (10) of cells included in one group at an equal interval in distance equal to the width (110 µm) of one group. Therefore, a local address I2 corresponding to the phase θ2 of this periodic function can be obtained according to the following expression:

$$l2=10[\mu m] \times \theta2/360. \quad (5)$$

As clear from the expression (5), even if the number of samples is increased and the resolution of θ2 is enhanced, actual distance corresponding to one period of a periodic function is not extended by it, therefore the enhancement of the resolution of θ2 is reflected on the resolution of a local address directly, and the precision of positional measurement is greatly enhanced, compared with a case of the plural light source system. This system which is different from the plural light source system is greatly characterized in this point. In this embodiment, the difference between the number of slits and that of cells per group is one, however, the smaller this difference is, the higher the precision is. Therefore, if the number of slits and that of cells per group are determined, this point is also required to be considered.

Though the only one-dimensional positional measurement in the direction of x-axis is described above, if the same one more light receiving part and light source part as the above ones are provided and these are used for positional measurement in the direction of y-axis, two-dimensional positional measurement and the calculation of the distance of are enabled. In the concrete, two-dimensional positional measurement is enabled by preparing a table consisting of a stage movable in the direction of x-axis (x stage) and a stage movable in the direction of y-axis (y stage) and providing a position measuring apparatus for measuring a position in the direction of x-axis to the x stage and a position measuring apparatus for measuring a position in the direction of y-axis to the y stage.

Figure 22:
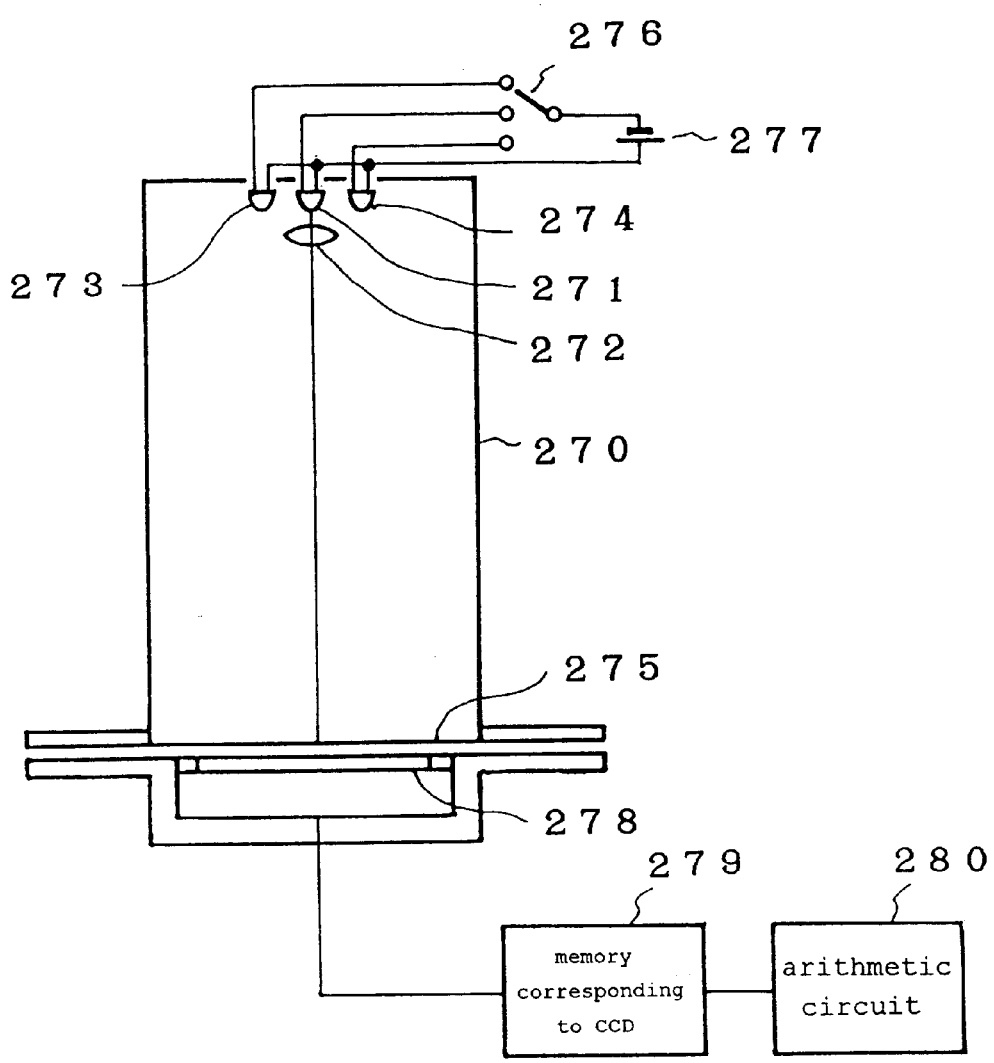
FIG. 22 is a schematic sectional view showing a tenth embodiment.

Next, referring to FIG. 22, a tenth embodiment will be described. FIG. 22 is a schematic sectional view showing a position measuring apparatus equivalent to the tenth embodiment based upon a slight difference system. This apparatus is not simply provided with the above one-dimensional two position measuring apparatuses for two-dimensional positional measurement but can measure a two-dimensional position efficiently and precisely by a skillful method.

A light source part 270 of the position measuring apparatus shown in FIG. 22 is provided with blue (B) LED 271, a lens 272, red (R) LED 273 for measuring a slit address in the direction of y-axis and green (G) LED 274 for measuring a slit address in the direction of y-axis, and further, is provided with a special slit mask 275 consisting of a photographic film. A switch 276 is provided to select the destination to which a power source 277 is supplied. This light source part 270 can be moved two-dimensionally opposite to the flat surface of CCD 278 and in parallel with the surface. In CCD 278, multiple cells are arranged two-dimensionally, that is, in the directions of x-axis and y-axis. A slit mask 275 is located close to CCD 278, hereby, thermal adhesion between both is enhanced and dislocation caused by thermal expansion can be minimized. After output from CCD 278 is temporarily stored in a memory 279 corresponding to CCD, the output is supplied to an arithmetic circuit 280 and predetermined operation is executed.

Figure 23:
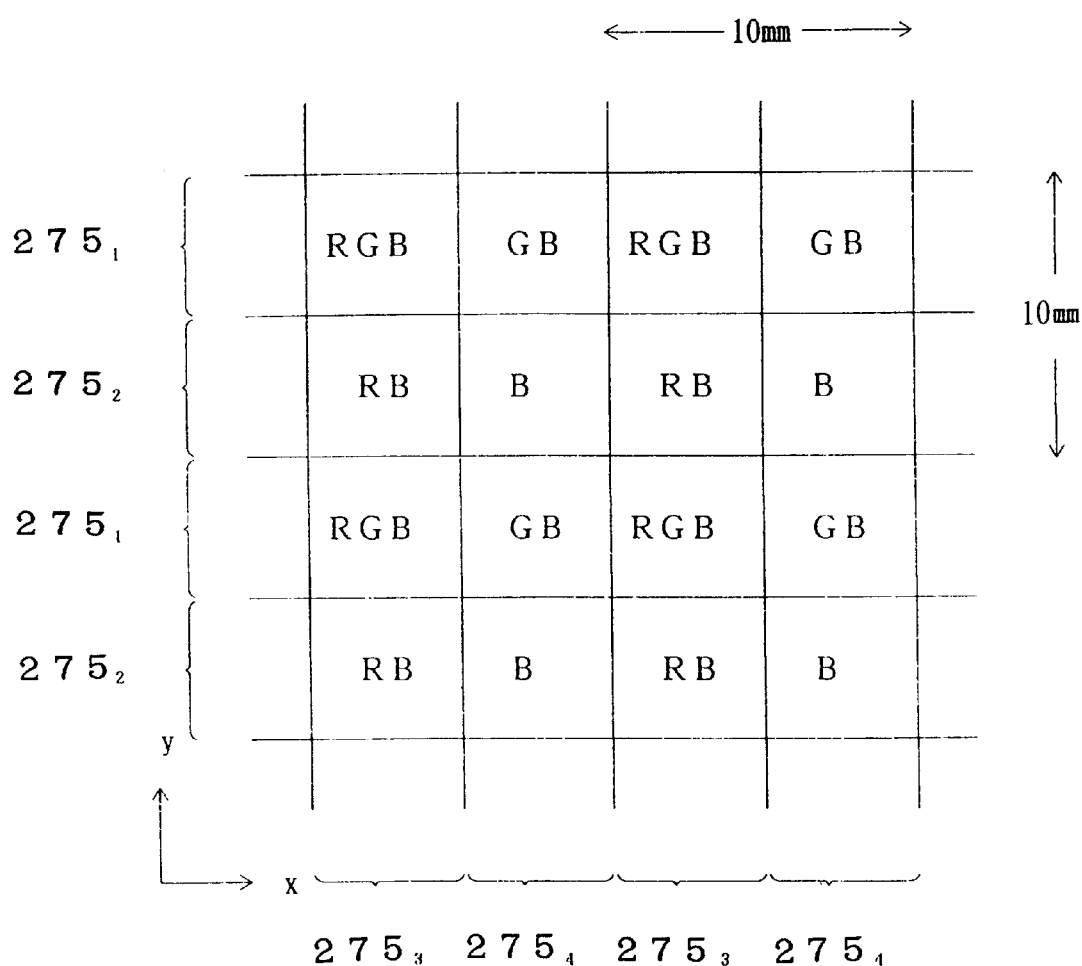
FIG. 23 is a plan enlarging a part of a slit mask in the tenth embodiment.

FIG. 23 is a plan showing an enlarged part of the slit mask 275. A property which transmits light of specific combined colors is provided to each area in the shape of a grid shown in FIG. 23. That is, an area shown by B transmits blue light, an area shown by RB transmits red light and blue light, an area shown by GB transmits green light and blue light, an area shown by RB transmits red light and blue light and an area shown by RGB transmits red light, green light and blue light. In the slit mask 275 shown in FIG. 23, a band area 2751 which transmits green (G) light and a band area 2752 which does not transmit this light are alternately arranged in parallel with x-axis. Therefore, the slit mask has the same effect for green light as it is provided with a slit provided in parallel with x-axis at the interval of 10 $\mu$m. A band area 2753 which transmits red (R) light and a band area 2754 transmits no red light are also alternately arranged in parallel with y-axis. Therefore, the slit mask has the same effect for red light as slits are arranged in parallel with y-axis at the interval of 10 $\mu$m. Further, any area transmits blue (B) light. The slit mask shown in FIG. 23 can be readily realized as a color filter using a photographic film.

When red LED 273 is put on, the slit mask 275 constituted as shown in FIG. 23 functions as a slit mask for measuring a position in the direction of x-axis and when green LED 274 is put on, it functions as a slit mask for measuring a position in the direction of y-axis. Further, the output of each light receiving device in the directions of x-axis and y-axis in the light receiving part which is added in every group shows that when blue LED 271 is put on because blue (B) light from blue LED 271 is transmitted at a fixed transmission factor on the overall surface of the slit mask, the largest added result as a group can be obtained. A relative position in units of group is obtained based upon this. Two-dimensional measurement of a position and distance is enabled based upon a rough position in units of group and a local address described in relation to the ninth embodiment.

Figure 24:
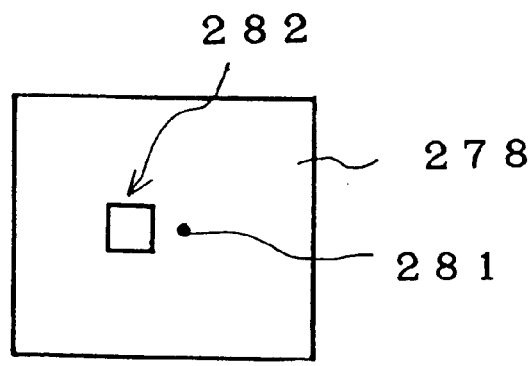
FIG. 24 schematically shows a range in which light is radiated from a blue light emitting diode (LED) and a range in which light is radiated from a light emitting device on the surface of CCD.

FIG. 24 schematically shows the irradiation range 271a of light from blue LED 271 and the irradiation range 272a of light from a light emitting device 272 on the surface of CCD 278 shown in FIG. 22. After blue light from the light emitting device 271 is suitably focused by the lens 272, the light is transmitted through the slit mask 275 provided with the above property as it is and forms a luminescent spot 281 on CCD 278. This light is used for obtaining a slit address. In the meantime, red light from red LED 273 and green light from green LED 274 are irradiated in an area 282 with fixed broadening on CCD 278.

A signal from each cell in CCD 278 is temporarily stored in a memory 279 corresponding to CCD and further, is supplied to an arithmetic circuit 280. In this arithmetic circuit, a variety of operation described in relation to FIGS. 4, 16 and 21 is executed and the two-dimensional position of the light source part 270 for CCD 278 can be obtained extremely precisely.

Figure 25:
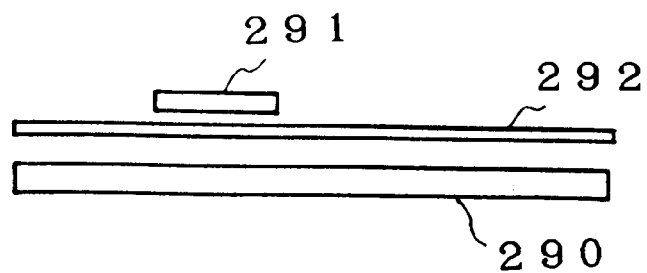
FIG. 25 is a schematic sectional view showing an eleventh embodiment.
Figure 26:
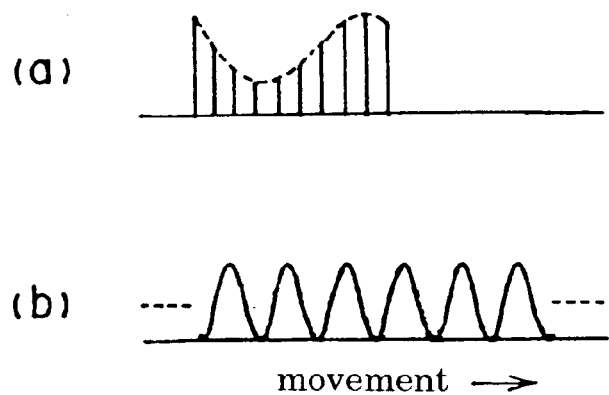
FIGS. 26(a) and (b) show the outline of a signal output from a line sensor.

FIG. 25 is a schematic sectional view showing an eleventh embodiment based upon the slight difference system. In this embodiment, a relative long light source part 290 is fixed and a line sensor 291 is provided over this light source part 290 and moved, however, the arrangement of cells and slits is similar to the constitution shown in FIG. 20. The line sensor 291 is equivalent to CCD 260 shown in FIG. 20. In FIG. 25, a line slit 292 in the light source part 290 is substantially similar to the slit mask 250 shown in FIG. 20 and light is irradiated on this line slit 292 from the light source part 290 on the lower side at fixed intensity. FIGS. 26(a) and (b) show the outline of a signal output from the line sensor 291, FIG. 26(a) corresponds to FIG. 21 and FIG. 26(b) shows a pulse signal for obtaining a slit address. A slit address is obtained based upon the signal shown in FIG. 26(b), the phase of the periodic function shown in FIG. 26(a) is calculated and a local address is obtained. Hereby, the relative position of the line sensor 291 for the light source part 290 can be obtained in detail up to its local address. According to this embodiment, the measurement of a position and distance in the relative long range in the horizontal direction is enabled.

Figure 27:
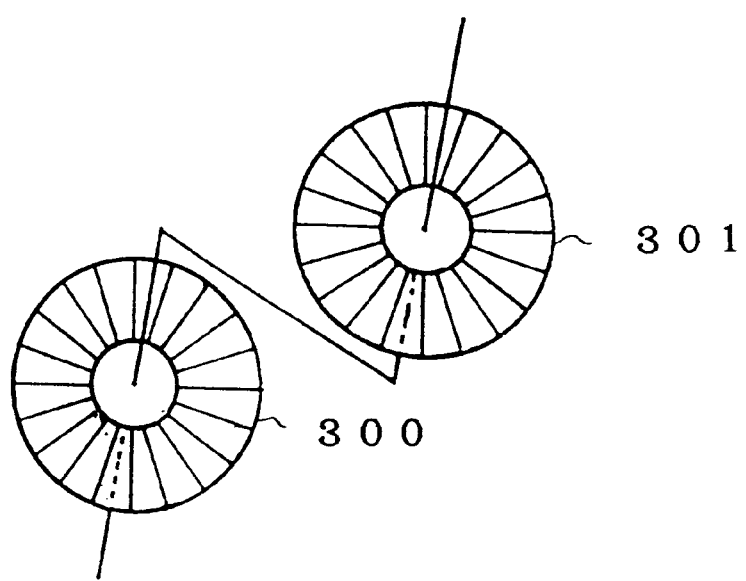
FIG. 27 is a schematic drawing showing a twelfth embodiment.

FIG. 27 is a schematic drawing showing a twelfth embodiment in which a light receiving part 300 and a light source part 301 are both circular based upon the slight difference system. In this embodiment, multiple cells in the light receiving part 300 re grouped by a predetermined number and slits of the number lightly different from the number of cells included in one group re arranged at an equal interval in an angular interval equal o the one of one group. As the ninth to eleventh embodiments in which cells and slits are linearly arranged, the relative turning angular position of the light receiving part 300 and the light source part 301 is precisely obtained by obtaining a periodic function based upon a signal output from each cell as shown in FIG. 21 and executing predetermined operation of this signal. Therefore, this apparatus can be applied to a rotary encoder which can measure a precise angular position.

Figure 28:
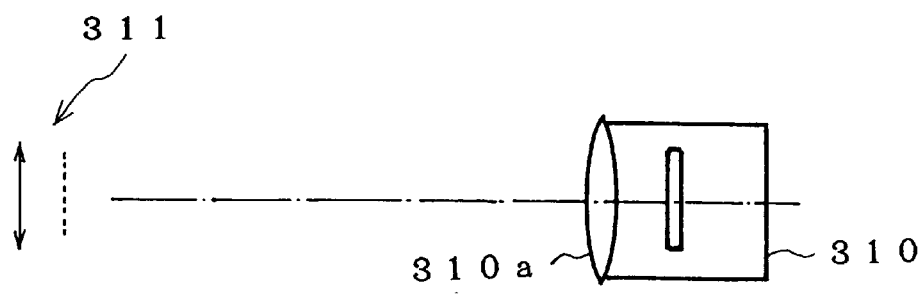
FIG. 28 is a schematic sectional view showing a thirteenth embodiment.

FIG. 28 is a schematic sectional view showing a thirteenth embodiment for precisely measuring the movement of an object to be measured located apart to some extent from a CCD camera 310 using the CCD camera 310 based upon the slight difference system. In this embodiment, multiple point light source columns 311 are fixed on an object to be measured which is vertically moved as shown in FIG. 25 and this light is adjusted by the lens 310a of the CCD camera 310 so that the light is incident on a CCD cell of the CCD camera 310. In this case, the incident interval of the point light source column on a cell is adjusted by focusing the camera. Hereby, this incident interval and the array interval of cells in the CCD camera are equivalent to the array interval of each slit of the slit mask 250 shown in FIG. 20 and each cell of CCD 250. Hereby, the position of an object to be measured can be precisely measured.

Figure 29:
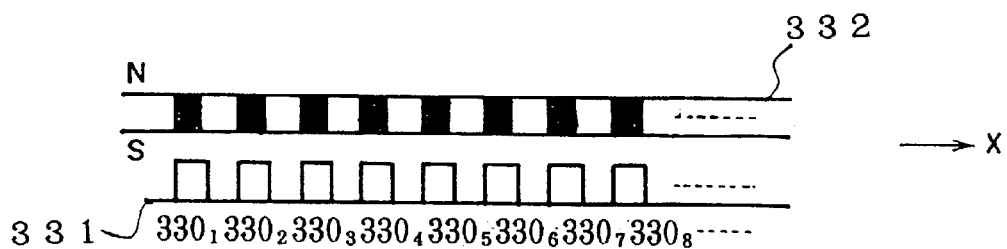
FIG. 29 is a schematic sectional view showing a fourteenth embodiment.

FIG. 29 is a schematic sectional view showing a position measuring apparatus equivalent to a fourteenth embodiment in which a magnetic field source is used in place of the light source or the slit in the above embodiments and a magnetic detecting device is used in place of light receiving means. In this case, the magnetic field source means a magnetic tape on which an area separated at a predetermined interval is magnetized and Hall element is used for the magnetic detecting device. Hall elements 3301, 3302, shown in FIG. 29 are respectively sensors which can measure magnetic field precisely and these are arranged on a substrate 331 at an interval equal to an interval between cells of CCD 260 shown in FIG. 20 for example. The magnetic tape 332 vertically magnetized at an interval equal to an interval between slits of the slit mask 250 shown in FIG. 20 is used in place of the slit mask 250 shown in FIG. 20. If this magnetic tape 332 is arranged over the substrate 331 with it slightly separated from the substrate 331 so that the magnetic tape can be moved in the horizontal direction (in the direction of x-axis) and predetermined operation of output obtained from each Hall element is executed, a periodic function as shown in FIG. 21 can be obtained. The relative position of the magnetic tape 332 for the substrate 331 can be precisely obtained up to its local address by calculating as described above based upon this periodic function.

The position measuring apparatus equivalent to this embodiment can be also readily developed into a two-dimensional position measuring apparatus as a measuring apparatus in which a plurality of light sources and a light receiving device are used.

In the above embodiments based upon the slight difference system, various modifications are allowed within the concept of the present invention. For example, in the above embodiments, the slit mask provided with multiple slits is used for a light source, light from the single light source is screened by this slit mask and light which passes through a slit is equivalently utilized as multiple light sources, however, the present invention is not limited to these and actually, multiple light sources may be also prepared. In that case, a slit address in the above embodiments is called a light source address. Further, in the above embodiments, a case that p =10 and q =11, that is, a case that p <q is described, however, the present invention is not limited to this, p and q have only to have suitable different values and a case that p >q is also allowed.

Next, fifteenth and sixteenth embodiments based upon "an interference system" will be described.

Figure 30:
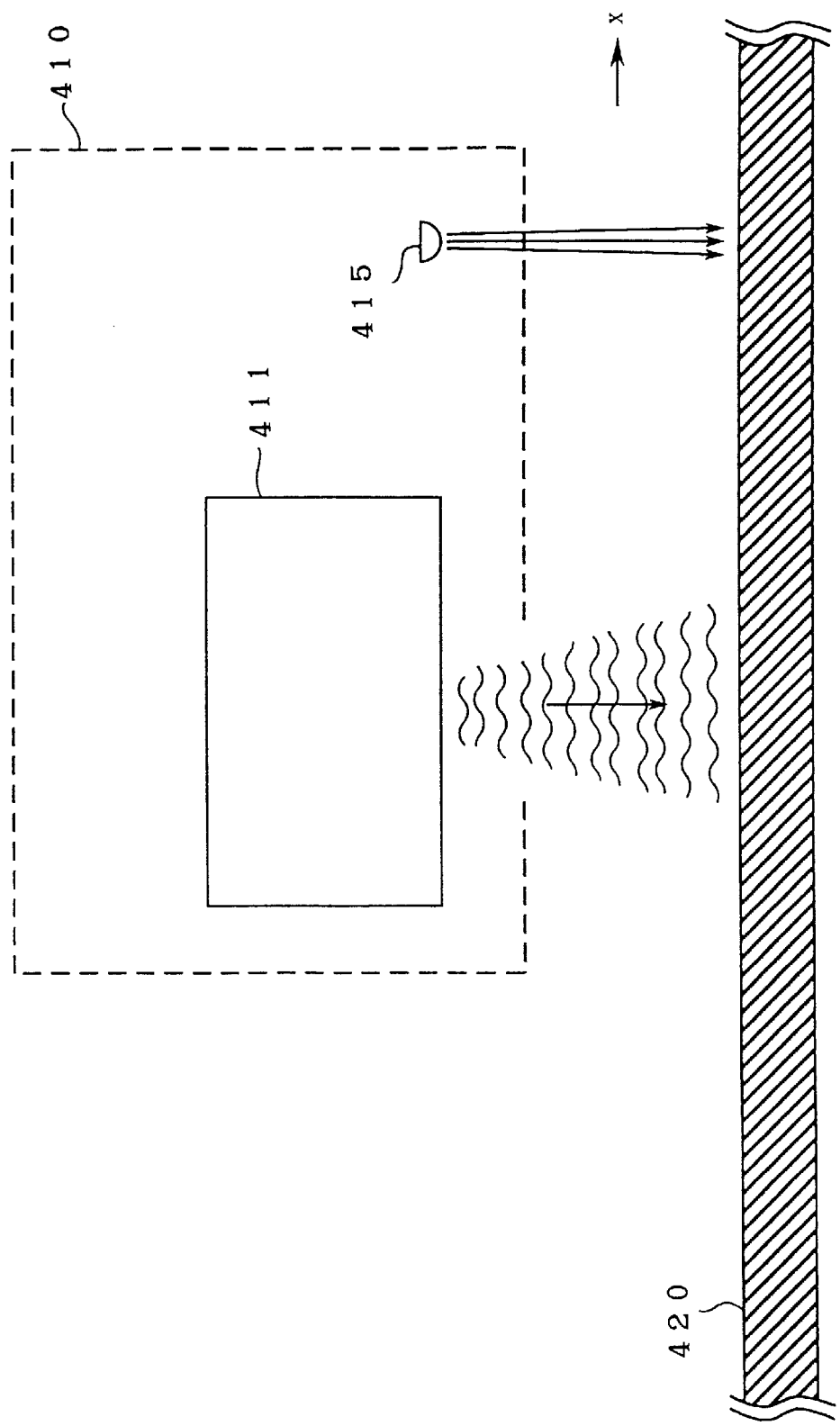
FIG. 30 is a sectional view showing the main part of a fifteenth embodiment.

FIG. 30 is a sectional view showing the main part of a position measuring apparatus equivalent to a fifteenth embodiment and shows one-dimensional CCD which is light receiving means and a light source part provided opposite to the surface of this CCD.

As shown in FIG. 30, the light source part 410 consists of optical interference generating means 411 and a light emitting device 415. For the optical interference generating means 411, something which causes optical interference based upon the same principle as a well-known interferometer such as Michelson interferometer, Mach-Zehnder interferometer, an interference refractometer of Jamin and Twyman-Green interferometer or a combination of an interferometer and laser beams can be utilized. The optical interference generating means 411 interferes a laser which is a light source using a suitable optical system and generates an interference fringe with a predetermined interval along the direction of the array of each cell on the light receiving face of CCD 420. An interference fringe the intensity of which varies at a substantially equal period can be formed by utilizing such an interferometer. In this case, the interval of the interference fringe is determined by the wavelength of a laser used, distance between the optical interference generating means 411 and CCD 420, the constant of the optical system of the optical interference generating means 411 and others. Something which forms a concentric interference fringe such as Michelson interferometer is arranged so that the direction of one diameter of these circles is equivalent to the direction of the array of cells of CCD 420. In the meantime, for the light emitting device 415, a light emitting diode (LED) and others can be utilized. The optical interference generating means 411 and the light emitting device 415 are integrated and an interval between both is adjusted in advance so that it is predetermined distance.

The light source part 410 is opposite to the surface of CCD 420 and can be freely moved relatively horizontally (in the direction of x-axis) for CCD 420. Multiple cells are arrayed at the interval of 10 $\mu$m in the direction of x-axis on CCD 420. Each cell is grouped so that serial eight cells are included in the same group. As in the above plural light source system, the position of the light source part 410 in one group is called a small address and the position in units of group of a cell to which the light source part is opposite on the surface of CCD 420 is called a large address. When a large address is required to be obtained, the light emitting device 415 is put on and when a small address is required to be obtained, the optical interference generating means 411 in the light source part 410 is put on. If distance or the relative position is actually measured, one is fixed and the other is moved of the light source part 410 and CCD 420. In this case, the light source part 410 is moved and CCD 420 is fixed.

Figure 31:
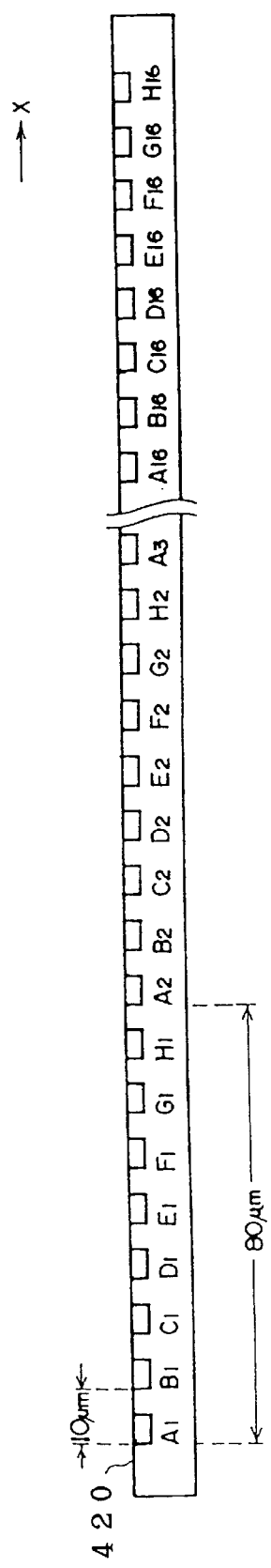
FIG. 31 is an enlarged view showing a part of FIG. 30.

FIG. 31 shows an enlarged part of the surface of CCD 420 shown in FIG. 30. As shown in FIG. 31, A1, B1, - - - denote each cell linearly arrayed at the interval of 10 $\mu$m on the surface of CCD 420 and in this case, to simplify, assume that 128 cells A1, B1, - - -, G16, H16 are provided. Each cell is divided into sixteen groups with serial eight cells in the same group as eight cells A1 to H1 are grouped as a group G1, eight cells A2 to H2 are grouped as a group G2, - - -, eight cells A16 to H16 are grouped as a group G16. Therefore, the length of one group is 80 $\mu$m.

Next, referring to the description of "a plural light source system", a method of obtaining an address in an interference system will be described. First, a large address is obtained, however, this method is substantially the same as that in the plural light source system. That is, a position measuring apparatus equivalent to this embodiment is provided with the same adding circuits as the adding circuits 1301 to 13016 shown in FIG. 11 and described in relation to the plural light source system. These adding circuits 1301 to 13016 are provided corresponding to the respective groups of cells of CCD 420, add signals output from cells included in a group every group and output L1 to L16. To obtain a large address, the optical interference generating means 41 is put off and only the light emitting device 415 is put on. The intensity distribution on CCD 420 of light emitted from the light emitting device 415 is the same curve as in FIG. 12. It is required that this intensity distribution has a single peak and the width of distribution is approximately the same as the length of one group.

Figure 12:
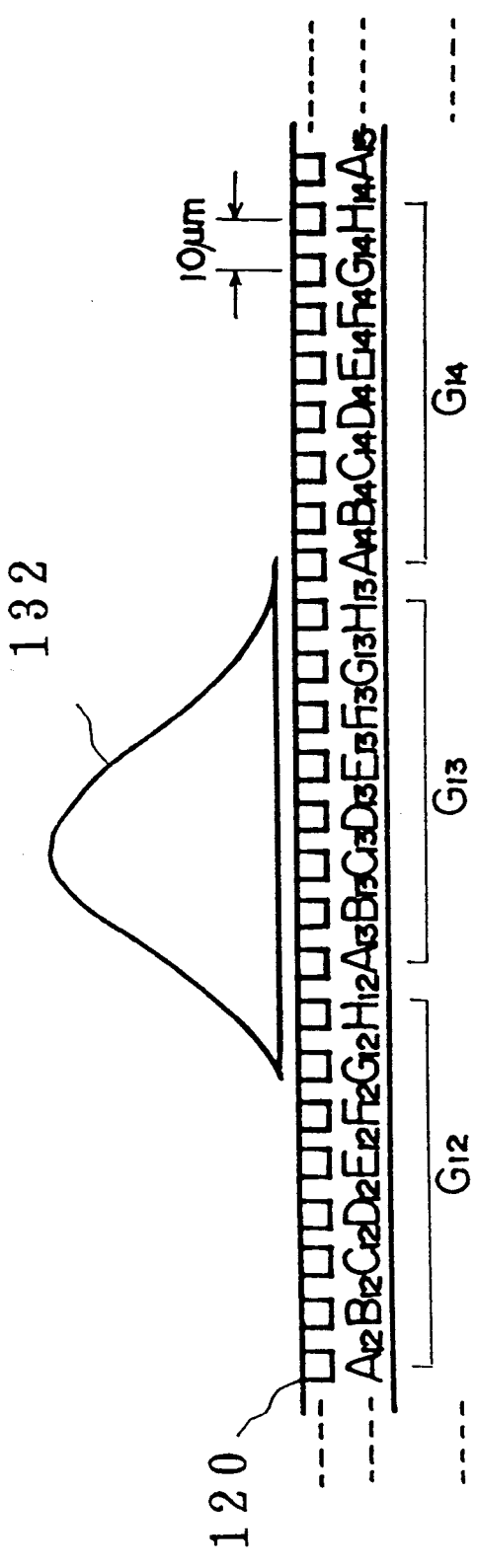
Figure 13:
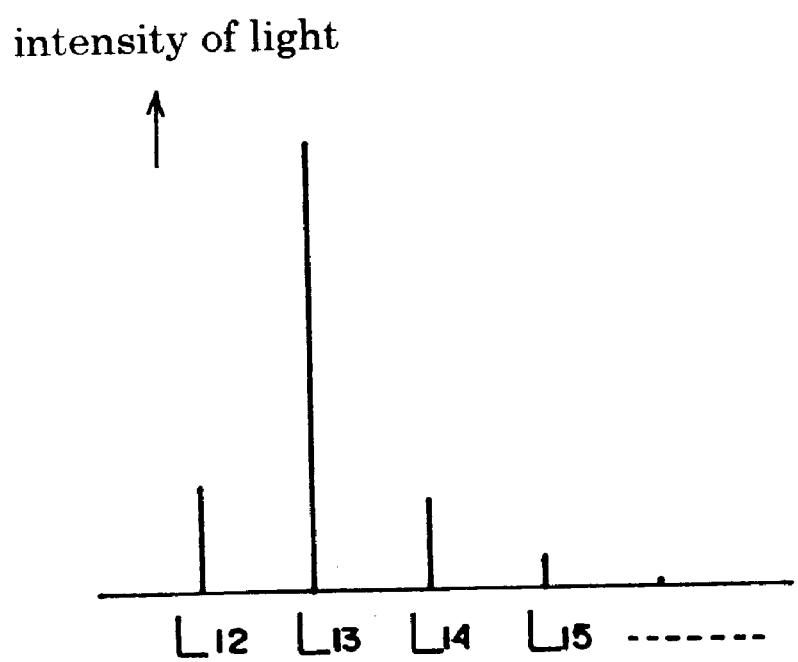

As shown in FIG. 12, if the center of the light emitting device 15 is in the range of the group G13, the output L1 to L16 of the adding circuits 1301 to 13016 is as shown in FIG. 13 and the output L13 of the adding circuit 13013 is the largest. Therefore, it is detected that the light emitting device 415 is opposite to the group G13 by comparing these signals L1 to L16 by an arithmetic circuit not shown and a large address can be obtained based upon this. If the light emitting device 415 is located in another position, a large address can be similarly obtained.

Figure 32:
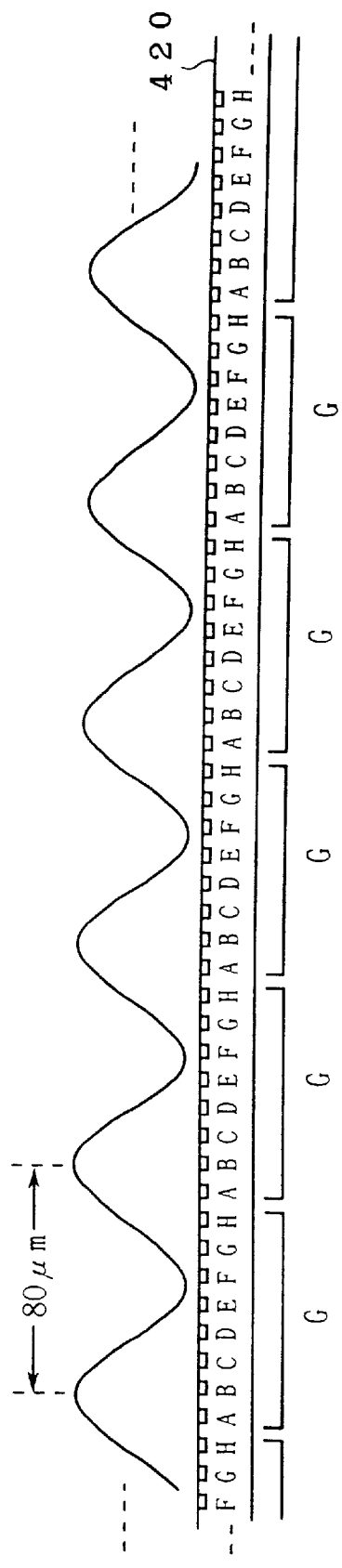
FIG. 32 shows the change of the light intensity level of an interference fringe on a light receiving face.

Next, a method of obtaining a small address will be described. If a small address is obtained, the light emitting device 415 is put off and the optical interference generating means 411 is put on. When the optical interference generating means 411 is put on, an interference fringe is generated on the light receiving face of CCD 420 by optical interference. FIG. 32 shows the change of an intensity level on the light receiving face based upon this interference fringe. However, in FIG. 32, the number of each cell of CCD 420 and that of groups are omitted. As described above, as the interval of an interference fringe formed by the optical interference generating means 411 is adjusted so that it is 80 $\mu$m, an intensity level varies at the period of 80 $\mu$m as shown in FIG. 32 and a plurality of peaks are formed every 80 $\mu$m.

This is equivalent to a state in which a plurality of light sources are provided at the interval of 80 μm over CCD 420 and light is incident on the light receiving face at a suitable broadening angle from these light sources. The period of 80 μm is equal to the width of one group of CCD 420. As a result, the output from the corresponding cells in the respective groups is equal in the range in which an interference fringe is formed on the light receiving face of CCD 420. The change of an intensity level shown in FIG. 32 is extremely similar to the intensity distribution shown in FIG. 14 and described in relation to the plural light source system. Therefore, the same principle as a small address is obtained according to the plural light source system can be applied.

When signals output from the corresponding cells in the respective groups of CCD 420 shown in FIG. 31 are added by the same adding circuits as those shown in FIG. 15, the same periodic function DT(x) with a large amplitude as the one shown in FIG. 16(b) and described in relation to the plural light source system can be obtained. When such a periodic function DT(x) is obtained, the phase from a reference point A determined for convenience to the peak value can be readily and precisely obtained using a well-known arithmetic circuit not shown as described in relation to the plural light source system. Even if pieces of a curve shown in FIG. 32 are slightly distorted, the same characteristics that they are mutually set off, high SN ratio is obtained and a small address can be precisely determined as in the plural light source system can be obtained.

When a large address and a small address are obtained as described above, the relative position of the light source part 410 and CCD 420 is determined based upon predetermined distance between the optical interference generating means 411 and the light emitting device 415.

One-dimensional positional measurement is described above, however, if one more set of the light source part and CCD is provided and these are arranged in the directions of x-axis and y-axis to measure a position in the respective directions, two-dimensional positional measurement are enabled and the calculation of the distance of movement are enabled. In the concrete, two-dimensional positional measurement is enabled by preparing a table consisting of a stage which is movable in the direction of x-axis (x stage) and a stage which is movable in the direction of y-axis (y stage) and respectively providing a position measuring apparatus for measuring a position in the direction of x-axis on the x stage and a position measuring apparatus for measuring a position in the direction of y-axis on the y stage.

In this embodiment based upon an interference system, various modifications are allowed within the concept of the present invention. For example, in the above embodiment, a case that CCD is used for a light receiving device is described, however, for example, phototransistors, photodiodes and the other light receiving devices may be used. This apparatus can be applied to various fields including a case that only one-dimensional measurement of the length is performed in addition to the above fields.

Next, a sixteenth embodiment based upon "a slight difference interference system" will be described. As the interference slight difference system is deeply related to the above "slight difference system" and "interference system", the description of these embodiments will be referred. In the above slight difference system, a large quantity of light is incident on CCD by the slit mask provided with slits at a predetermined interval. In the meantime, in the slight difference interference system in this embodiment, an interference fringe is formed on the light receiving face of CCD utilizing optical interference as in the interference system and the same effect as a case that light is incident through a large number of slits can be obtained by changing intensity at the period equal to an interval between the above slits. Hereby, each cell of CCD and the bright part of an interference fringe are related as those in the slight difference system.

Figure 33:
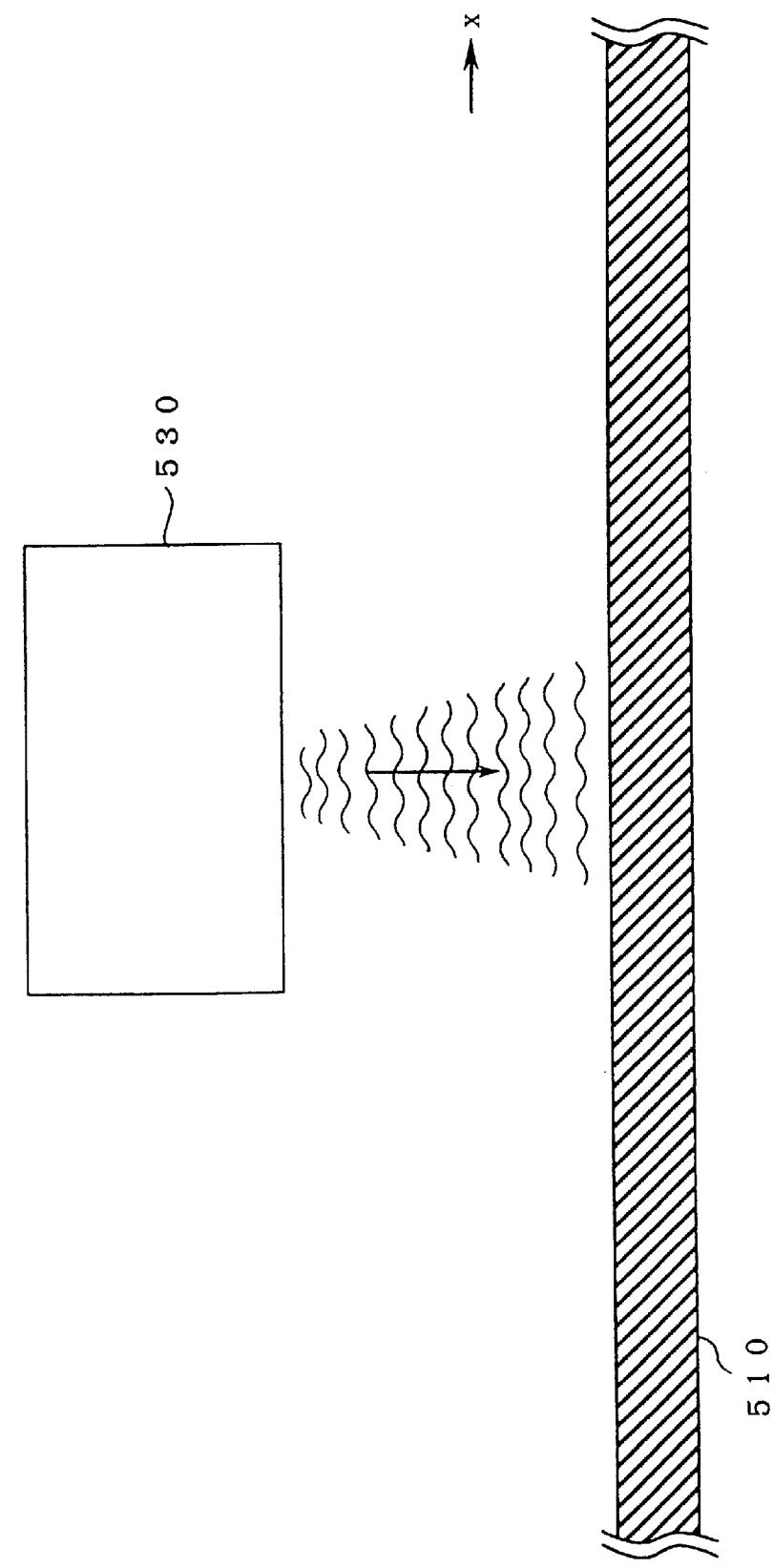
FIG. 33 is a schematic sectional view showing a sixteenth embodiment.
Figure 34:
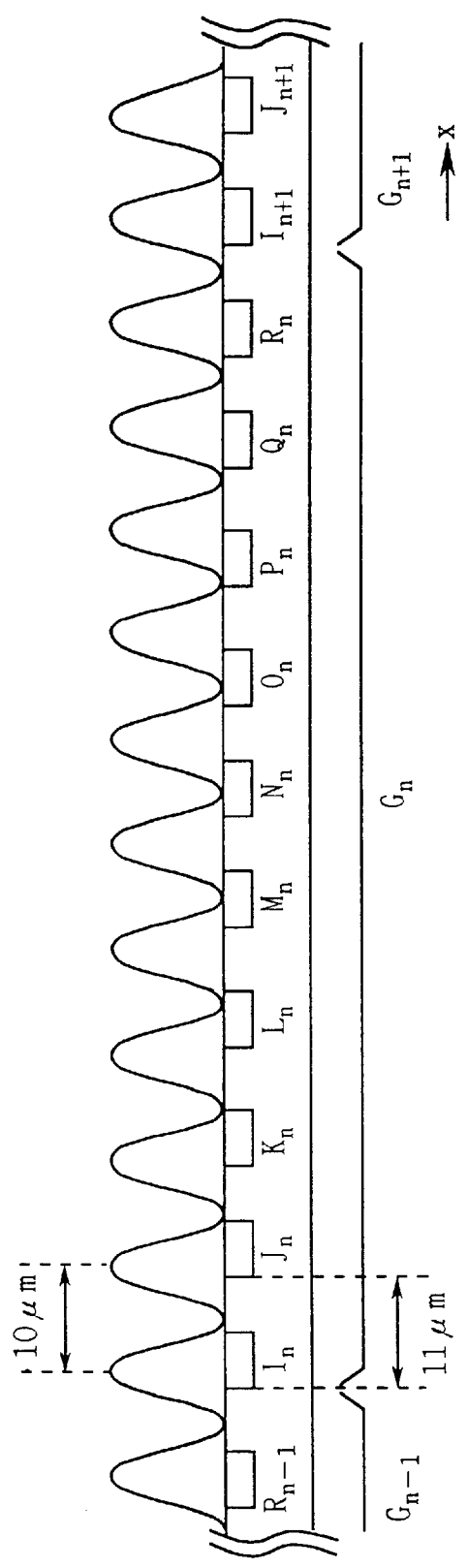
FIG. 34 is a sectional view enlarging a part of FIG. 33.

FIG. 33 is a schematic sectional view showing a position measuring apparatus equivalent to the sixteenth embodiment. As shown in FIG. 33, optical interference generating means 530 is provided over two-dimensional CCD 510 and an interference fringe is formed on the light receiving face of CCD 510 by light emitted from it. In the interference fringe, a bright part and a dark part alternately appear and it shows the change of intensity. The sixteenth embodiment is the same as the fifteenth embodiment based upon the interference system shown in FIG. 30 in that the optical interference generating means is used, however, the interval of an interference fringe in the slight difference interference system is shorter, compared with the interval of an interference fringe in the interference system. FIG. 34 is a sectional view showing an enlarged part of CCD 510 shown in FIG. 33 and corresponds to FIG. 32 described in relation to the interference system. Intensity generated by an interference fringe shows periodic change in the shape of sinusoidal wave as shown in FIG. 34. For the optical interference generating means 530 shown in FIG. 33, something which causes optical interference based upon the same principle as a well-known interferometer such as Michelson interferometer, Mach-Zehnder interferometer, an interference refractometer of Jamin and Twyman-Green interferometer or a combination of an interferometer and laser beams can be utilized as in the interference system. The optical interference generating means 530 interferes a laser which is a light source by a suitable optical system and an interference fringe with a predetermined interval is generated on the light receiving face of CCD 510 in the direction of the array of each cell.

An interference fringe in which intensity varies at a substantially equal period can be formed as shown in FIG. 34 by utilizing the above interferometers. In this case, the interval of the interference fringe is determined by the wavelength of a laser used, distance between the optical interference generating means 530 and CCD 510, the constant of the optical system of the optical interference generating means 530 and others and the optical interference generating means is adjusted so that the interval is a period slightly different from an interval between cells of CCD 510, that is, 10 μm in an example shown in FIG. 34. If the optical interference generating means 530 forms a concentric interference fringe, the concentric interference fringe is arranged so that the direction of one diameter of these circles is equivalent to the direction of the array of cells of CCD 510.

The periodic change of intensity obtained by the optical interference generating means 530 shown in FIG. 34 is equivalent to a case described in relation to the slight difference system that multiple light sources are arranged at the interval of 10 μm over CCD 260 shown in FIG. 20 an interval between cells of which is 11 μm. Therefore, when the optical interference generating means 530 is moved by 10 μm in the direction of x-axis, a periodic function obtained as in FIG. 21 also shows the change of one period. If the phase of the peak of the obtained periodic function is obtained according to the same procedure as that described in relation to the slight difference system, the local address for CCD 510 of the optical interference generating means 530 can be obtained. An address corresponding to a slit address in the slight difference system can be obtained by the same method as that in the slight difference system by always monitoring the output value of a specific cell, for example a cell In shown in FIG. 20. Further, if the apparatus shown in FIG. 33 is also provided in the direction of y-axis, two-dimensional address on an x-y plane can be also obtained.

One-dimensional positional measurement is described above, however, if one more of the apparatus shown in FIG. 33 is provided and these are arranged in the directions of x-axis and y-axis to measure a position in the respective directions, two-dimensional positional measurement and the calculation of the distance of movement are enabled. In the concrete, two-dimensional positional measurement is enabled by preparing a table consisting of a stage which is movable in the direction of x-axis (x stage) and a stage which is movable in the direction of y-axis (y stage) and respectively providing a position measuring apparatus for measuring a position in the direction of x-axis on the x stage and a position measuring apparatus for measuring a position in the direction of y-axis on the y stage.

In this embodiment based upon an interference system, various variations are allowed within the concept of the present invention. For example, in the above embodiments, a case that p=10 and q=11, that is, a case that p<q is described, however, the present invention is not limited to this, p and q have only to have suitable different values and a case that p>q is also allowed.

INDUSTRIAL AVAILABILITY

As described above, a position measuring apparatus according to the present invention is useful for measuring the length or distance precisely and can be utilized in various fields including a semiconductor device manufacturing field in which precise measurement is required.

What is claimed is:

1. A turning angle measuring apparatus, comprising:

light receiving means in which total p pieces of light receiving devices circularly arranged at an equal interval are divided into r pieces of groups each of which includes q pieces $(p=q \times r)$;

light source means which can be turned around the same axis as the axis of said light receiving means along said light receiving devices circularly arranged for radiating light on a plurality of light receiving devices of said light receiving means;

first position specifying means for specifying the position of said light source means in units of the length of one group; and second position specifying means for obtaining the periodic function from q pieces of signals obtained by adding the output of the corresponding light receiving devices in each of r pieces of groups, calculating the phase of this periodic function and determining the position in the range of the length of one group of said light source means, wherein:

the relative turning angle of said light source means for said light receiving means is measured.

2. A turning angle measuring apparatus, comprising:

light receiving means in which a plurality of light receiving devices arranged in the direction of rotation at an equal interval are grouped so that each group includes i pieces of light receiving devices;

light source means which arranges j pieces ($j \neq i$) of light sources for radiating light with predetermined broadening on said light receiving means per angular range equal to the angular range of one group including i pieces of said light receiving devices in the direction of rotation equal to said light receiving means at an equal interval and can be turned around the same axis as the axis of said light receiving means so that said each light source is moved along said light receiving devices circularly arranged;

first position specifying means for specifying the relative angular position of said light source means and said light receiving means in units of distance between the light sources of said light source means;

adding means for adding signals output from the corresponding light receiving devices included in the respective groups of every group when said each light receiving device receives light from said each light source and outputting i pieces of added results; and second position specifying means for obtaining the periodic function from i pieces of added results obtained as a result of adding operation by said adding means, calculating the phase of this periodic function and calculating the relative turning angle of said light receiving means and said light source means in the range of said distance between light sources, wherein:

the relative turning angle of said light source means for said light receiving means is measured.

* * * * *